United States Patent [19]
Maynard

[11] 3,857,781
[45] Dec. 31, 1974

[54] METHOD OF RAPID DIFFERENTIAL FLOCCULATION OF TIO₂ FROM KAOLIN SLURRIES

[75] Inventor: Robert Nelson Maynard, Cochran, Ga.

[73] Assignee: J. M. Huber Corporation, Locust, N.J.

[22] Filed: June 8, 1972

[21] Appl. No.: 263,730

[52] U.S. Cl. .................... 209/5, 106/72, 423/128
[51] Int. Cl. .............................................. B03b 1/04
[58] Field of Search ............. 209/5; 106/72, 288 B; 23/110; 423/122, 128

[56] References Cited
UNITED STATES PATENTS

| | | | |
|---|---|---|---|
| 1,324,958 | 12/1919 | Feldenheimer | 209/5 |
| 1,774,510 | 9/1930 | Grossman | 209/5 |
| 1,925,058 | 8/1933 | Rowland | 106/72 |
| 3,130,063 | 4/1964 | Millman | 106/288 B |
| 3,303,035 | 2/1967 | Kemstock | 106/288 B |
| 3,371,988 | 3/1968 | Maynard | 106/72 X |
| 3,446,348 | 5/1969 | Sennett | 209/5 |
| 3,536,264 | 10/1970 | Melton | 209/5 X |
| 3,701,417 | 10/1972 | Mencade | 209/5 |

FOREIGN PATENTS OR APPLICATIONS

| | | | |
|---|---|---|---|
| 237,671 | 11/1969 | U.S.S.R. | 100/72 |
| 373,520 | 5/1932 | Great Britain | 106/72 |

Primary Examiner—Robert Halper
Attorney, Agent, or Firm—Harold H. Flanders; Donald S. Lilly

[57] ABSTRACT

Treatment of reflocculated aged kaolin slurries with anionic, high molecular weight polymer in the presence of specified inorganic salts flocs and settles titanium and iron contaminants leaving extremely white kaloin clay in suspension.

6 Claims, 23 Drawing Figures

Fig. 4
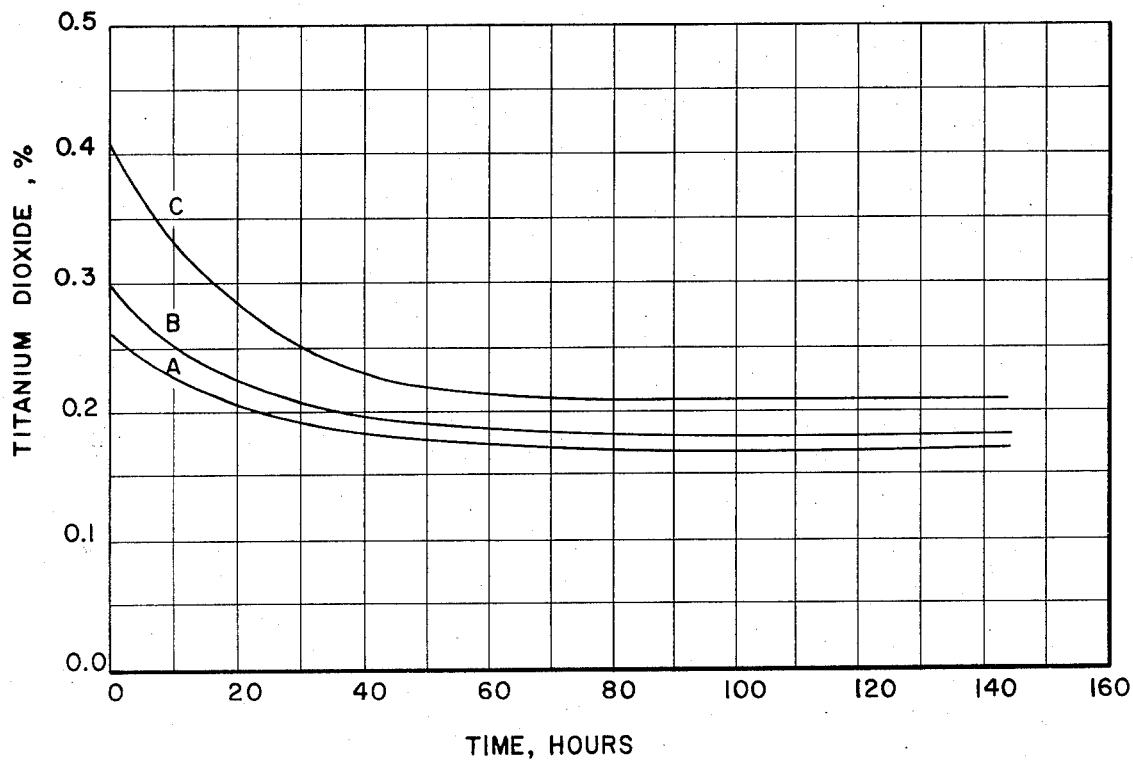
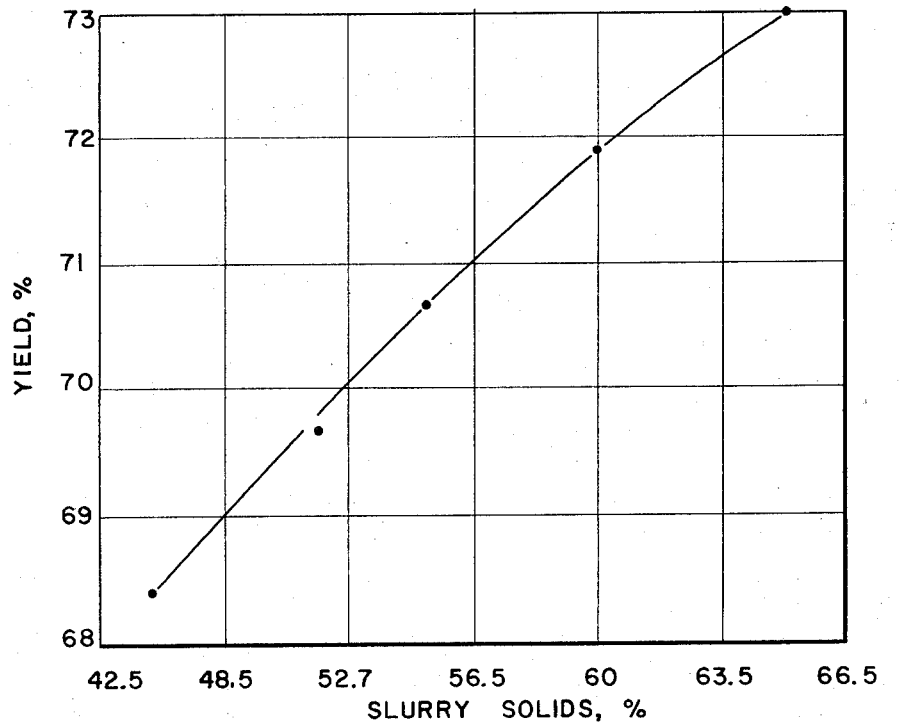
Fig. 5

SODIUM HEXAMETAPHOSPHATE

POUNDS/ TON CLAY

METHOD OF RAPID DIFFERENTIAL FLOCCULATION OF TIO₂ FROM KAOLIN SLURRIES

BACKGROUND OF THE INVENTION

In general, the present invention relates to the beneficiation of clays and more particularly to the differential flocculation of $TiO_2$ from kaolin slurries.

Natural occurring clays vary considerably in their color properties, even when produced from mines in the same locality or even from different sites in the same mine. Natural occurring kaolin clay deposits contain discoloring contaminants, for example, iron and titanium minerals. Titanium minerals in kaolin usually occur as discolored particles and these are largely responsible for the yellow-brown shade of many kaolins. Often a clay is rejected as being unsuitable for commercial use solely on the basis of color even though its other physical properties such as the viscosity of clay-water slurries and particle size distribution are within desired limits.

The brightness of clays usually is increased by fractionation, the finer the particle size the brighter the clays; however, this increase is insufficient for the more discolored clays in order to be acceptable commercially and additional treatment is required of the refined clays such as chemical bleaching. Bleaching with chemicals such as zinc or sodium hydrosulphite generally results in improved brightness of the refined clay slurries, but this is usually an increase of only 2 to 5 brightness points. There are other methods of improving the brightness of clays but generally they are quite expensive and do not give a sufficient increase in brightness to justify the expense.

An important step forward in the solution of the brightness problem was made by Maynard, et al, as disclosed in U.S. Pat. No. 3,371,988.

This process while yielding a high brightness product requires relatively long sedimentation periods proceeding a sedimentation rate on the order of 70 to 100 minutes per inch of slurry depth. Attempts to utilize centrifuges in order to accelerate the sedimentation rate have thus far failed to produce acceptable yields.

SUMMARY OF THE INVENTION

Accordingly, it is an object of this invention to provide a new, highly effective method of removing discoloring $TiO_2$ contaminants and of overcoming the deficiencies of the prior art approaches.

Other objects and a fuller understanding of the invention may be had by referring to the following description and claims taken in conjunction with the accompanying drawings.

The present invention overcomes the deficiencies of the prior art and achieves its objectives by the treatment of a reflocculated aged kaolin slurry with an anionic, high molecular weight polymer in the presence of specified inorganic salts. This process flocculates and settles titanium and iron contaminants at an extremely rapid sedimentation rate of 2 to 10 minutes per inch of slurry depth, leaving an extremely white kaolin clay in suspension.

BRIEF DESCRIPTION OF THE DRAWINGS

In order to facilitate the understanding of this invention, reference will now be made to the appended drawings of preferred embodiments of the present invention. The drawings should not be construed as limiting the invention but are exemplary only.

In the drawings:

FIG. 4 shows the effect of sodium hexametaphosphate dosage on the percentage of titanium oxides retained in the finished clay following various storage times of the dispersed slurry.

FIG. 5 shows the effect of various slurry solids during chemical treatment on the yield.

DESCRIPTION OF THE PREFERRED EMBODIMENTS

I. General Procedure

Figure 1:
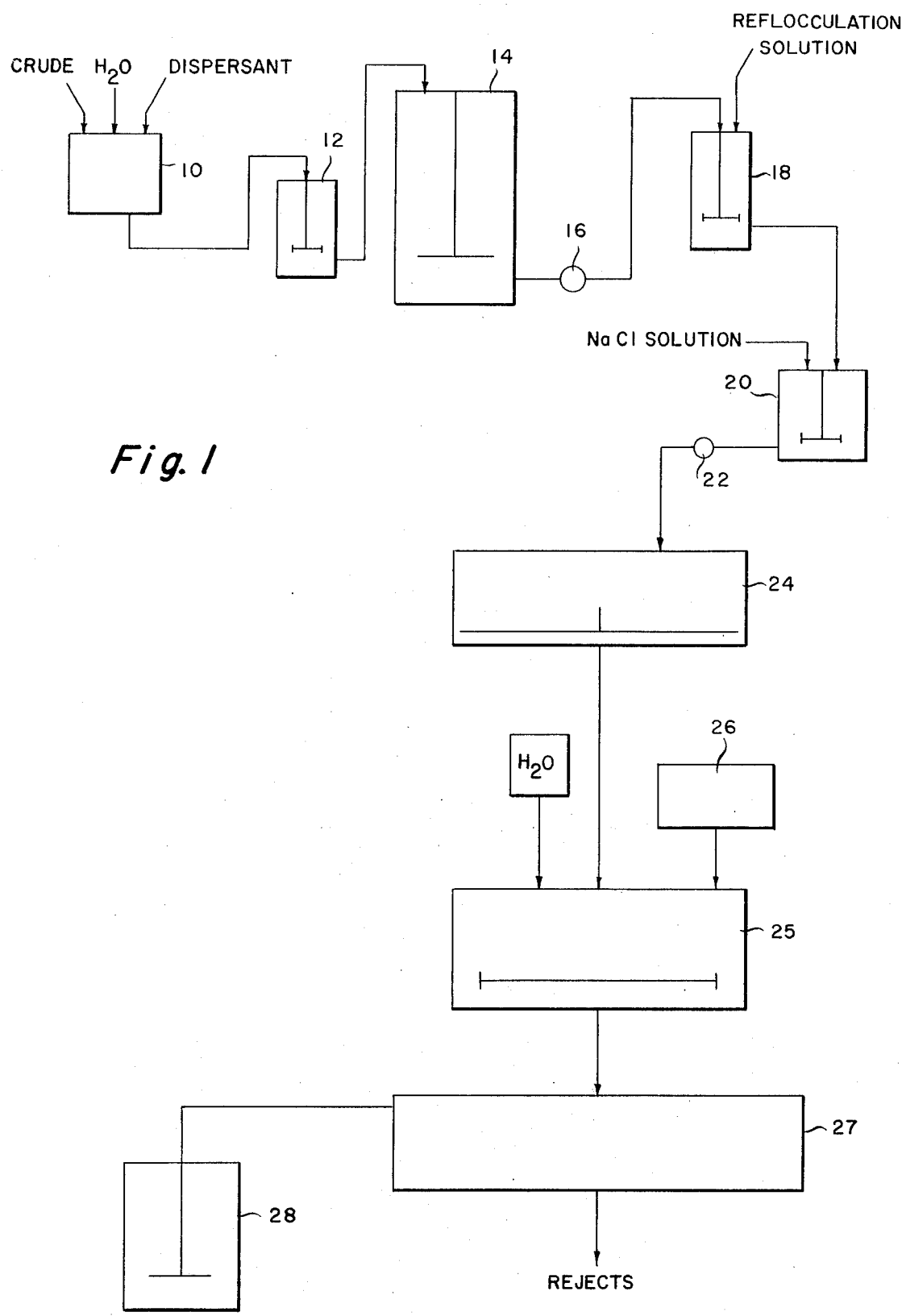
FIG. 1 is a flow diagram showing the general process of the present invention.

As illustrative of a general and typical procedure of a preferred embodiment of the present invention consider the following process as shown in FIG. 1 of treatment of a Georgia crude kaolin clay possessing a brightness of 78 percent and impurities comprising 2.3 percent titanium dioxide and 1.2 percent iron oxide.

A. Dispersion of Crude

The above crude may be made down and dispersed in blunder 10 to a minimum slurry solids of from 45 to 70 percent solids by weight.

The dispersant may typically contain 5 pounds of sodium hexametaphosphate per ton of clay and 5 pounds of sodium metasilicate per ton of clay.

The term "Calgon" as used herein and on the drawings is a trademark of Calgon, Inc. for sodium phosphate glass or sodium hexametaphosphate having a molecular ratio of $1.1Na_2O:1P_2O_5$ with a minimum of 65 percent $P_2O_5$. As such and for the purposes of this application Calgon has been used interchangeably with sodium hexametaphosphate and vica versa.

In genral, TSPP and STPP have been found to be less effective than the above dispersants in this procedure.

The above noted combination of dispersants appears to maintain slurry fluidity and dispersion for longer periods of time than either component alone.

The dispersed crude may optionally then be passed through a blunger 12 to a storage tank 14.

For many products it may be desirable to age the dispersed slurry for a minimum of 24 hours, but aging at this point is not essential.

B. Reflocculation

The slurry may then be metered from storage tank 14 through metering pump 16 to Cowles dissolver 18 or similar high shear mixing tank.

In treatment tank 18 a 25 percent chemical solution consisting of 2 pounds of sodium hexametaphosphate per ton of dry clay and 8 pounds per ton of dry clay of sodium metasilicate is added and mixed.

In general it is desired that the total chemical dosage produced throughout the process not exceed 10 pounds of Calgon and 20 of sodium metasilicate per ton of dry clay, including the initial dispersion dosages.

C. Dilution and Mixing of Reflocculated Slurry

The reflocculated slurry at 65 - 66% solids may then be passed to a Cowles or other suitable dilution tank 20 and there be diluted to 25 - 45 percent solids, preferrably 40 percent solids and thoroughly mixed.

D. Salt Treatment of Diluted Slurry

During the initial stages of dilution approximately 12 percent salt solution of sodium chloride is added at a rate of from 4 - 50, preferably about 15 pounds per ton of dry clay.

The salt treated slurry at approximately 40 percent solids may then be pumped by pump 22 to an aging tank 24.

E. Aging of Treated Slurry

Static, quiescent aging of the salt treated slurry at about 40 percent solids for a period of from 5 to 24 hours yields superior results; however, aging with mild agitation for a period of from 1 to 5 hours produces acceptable results and may be preferred as more practical in commercial production.

F. Dilution of Aged Slurry

After aging, the slurry should be further diluted to form 10 - 35 percent solids with an amount of water [having a temperature of 16° - 38° C (preferrably about 24°C)] sufficient so that following polymer addition the slurry has the desired solids concentration, preferrably 20 percent.

G. Polymer Treatment

Immediately following or during dilution, the slurry is treated in mixing tank 25 with a strongly anionic, high molecular weight polymer from polymer makedown tank 26 in a dosage of 0.01 to 0.3 pounds per ton of dry clay. The polymer is in general maded down in 26 as a 0.02 to 0.1 percent aqueous solution prior to addition to the slurry.

H. Mixing During and After Addition of the Polymer

Agitation must be sufficient to incorporate the polymer solution rapidly into the clay slurry. However, any severe agitation that begins to break up the fragile titanium-polymer flocs or other flocs of sand, coarse clay particles or titanium-iron impurities formed tends to rapidly decrease the quality of the product.

Agitation by mechanical means, air, etc. may be employed.

I. Sedimentation of Titanium-Polymer Flocs

Sedimentation of the titanium-polymer flocs is rapidly accomplished in settling tank 27. The flocs, upon standing, begin rapidly settling out of suspension with sedimentation rates varying from 2 to 10 minutes per inch of slurry depth used. Withdrawal of the refined slurry at about 4 - 25 percent solids (preferrably on the order of 18 percent) may be initiated by siphoning or other methods. It should be noted that the polymer is removed from the system with the rejected flocs.

J. Processing the Refined Slurry

The refined clays may be stored in tank 28 and later processed by washing, leaching, filtering and drying as is well known in the art.

II. Examples

EXAMPLE 1

As a control for the next three examples, a sample of crude clay was obtained from a mine located in East Georgia. This crude had a brightness of 82.9 and contained 2.00 percent, by weight, of titanium impurities expressed as $TiO_2$ and 1.06 percent, by weight, of iron impurities expressed as $Fe_2O_3$. This crude was slurried at about 35 percent solids and dispersed with 6 pounds of sodium hexametaphosphate (Calgon) per ton of dry clay, an amount required to obtain minimum viscosity.

A conventional type of fine fraction was separated from the dispersed crude. This slury was composed of clay having a brightness of 86.3 and containing 2.01 percent, by weight, of titanium impurities expressed as $TiO_2$ and 1.07 percent, by weight, of iron impurities expressed as $Fe_2O_3$. Conventional leaching with 10 pounds of zinc hydrosulfite per ton of dry clay and 4 pounds of alum per ton of dry clay gave a brightness of 88.5.

The following example demonstrates the liberation and sedimentation of titanium impurities from a clay suspension at a relatively slow settling rate as revealed in our co-pending application, Ser. No. 97,270 now abandoned.

EXAMPLE 2

The starting crude of Example 1 was treated by mixing in a Waring Blender for 20 minutes at 65 percent solids with a dispersant, a combination of sodium hexametaphosphate, amounting to 10 pounds per ton of dry clay and sodium metasilicate, amounting to 20 pounds per ton of dry clay. This treated clay was diluted to 25 percent solids, by weight, and additionally treated with 4 pounds of sodium chloride per ton of dry clay and mixed 15 minutes. The slurry was transferred to a transparent contained and allowed to settle without agitation at a slurry height column of 15 inches for 24 hours (a sedimentation rate of 1.6 hours per inch of slurry depth). At the end of the settling period of 24 hours, the volume of a highly discolored, yellow-brown sediment had become constant in depth. The clay suspension was withdrawn leaving the deposit in the bottom of the container.

The recovered clay, containing 21.63 percent clay slurry solids, was washed substantially free of excess chemicals. This was accomplished by acidifying the slurry to 5.75 pH with about 16.5 pounds of sulfuric acid per ton of dry clay and to a 4.20 pH with about 17.0 pounds of alum per ton of dry clay to create a flocculated slurry which was filtered. The filtered material was diluted with water and reslurried to about 25 percent solids. This slurry was composed of clay having a brightness, after leaching, of 92.2 and contained 0.76 percent, by weight, of titanium impurities expressed as $TiO_2$ and 1.03 percent, by weight, of iron impurities expressed as $Fe_2O_3$.

The following two examples demonstrate a more effective removal of titanium from a clay suspension at an extremely rapid settling rate.

EXAMPLE 3

The starting crude of Example 1 was treated, to form a reflocculated slurry, by mixing in a Waring Blender for 20 minutes at 65 percent solids with a dispersant, a combination of sodium hexametaphosphate, amounting to 4.5 pounds per ton of dry clay, and sodium metasilicate amounting to 15 pounds per ton of dry clay. This treated slurry was diluted with water to 25 percent solids, by weight, and additionally treated with sodium chloride, amounting to 30 pounds per ton of dry clay, and mixed 15 minutes. This specially treated clay slurry was allowed to age without agitation for a period of about 18 hours. During this aging period, the clay slurry contained sodium chloride at a concentration of 0.086 gram moles per liter of water.

After aging, the clay slurry was treated with Betz Polymer 1230 (a polymer identified as being an anionic, extremely high molecular weight, organic copolymer of acrylamide) previously dissolved in water at a concentration of 0.0667 percent, by weight, and amounting to 0.25 pounds, dry basis, per ton of dry clay. The polymer solution was blended with the clay slurry with mild mixing for a period of 10 minutes. At this point, after addition of the polymer solution, the clay slurry consisted of 10 percent, by weight, of clay solids and contained a sodium chloride concentration of 0.0284 gram moles per liter of water.

Immediately upon addition of the polymer solution to the clay slurry, numerous highly discolored, yellow-brown flocs were observed to form with the remaining, dispersed clay fraction now being extremely white in comparison with the slurry prior to the polymer treatment. Upon standing, the highly discolored flocs settled out of suspension at an extremely rapid rate of 0.04 hours per inch of slurry depth. The remaining clay suspension, containing about 6.5 percent clay solids, was withdrawn leaving the deposit of flocs in the bottom of the container.

The recovered clay was washed substantially free of excess chemicals and leached by the method described in Example 2.

This specially beneficiated clay had a brightness of 94.2 and contained 0.18 percent, by weight, of titanium impurities expressed as $TiO_2$ and 1.0 percent, by weight, of iron impurities expressed as $Fe_2O_3$.

EXAMPLE 4

Example 3 was repeated except the reflocculated and salt treated clay, after aging, was treated with Nalco 635, a polymer identified as being a strongly anionic, high molecular weight (in excess of one million), water soluble polyacrylamide, previously dissolved in water at a concentration of 0.1 percent, by weight, and amounting to 0.25 pounds, dry basis, per ton of dry clay.

This specially treated clay had a brightness of 94.4, after leaching, and contained 0.18 percent, by weight, of titanium impurities expressed as $TiO_2$ and 1.02 percent, by weight, of iron impurities expressed as $Fe_2O_3$.

The following four examples demonstrate the effect of aging, without mixing, the reflocculated and salt treated slurry for varying lengths of time prior to the polymer treatment.

EXAMPLE 5

A sample of crude clay, having a brightness of 80.0 and containing 2.23 percent, by weight, of titanium impurites expressed as $TiO_2$ and 1.15 percent, by weight, of iron impurities expressed as $Fe_2O_3$, was treated, in a master batch, by mixing with a Cowles Dissolver for 16 minutes at 65 percent solids with a dispersant, a combination of sodium hexametaphosphate, amounting to 4 pounds per ton of dry clay, and sodium metasilicate, amounting to 15 pounds per ton of dry clay.

This treated clay was diluted with water to 26 percent solids and additionally treated with sodium chloride, amounting to 35 pounds per ton of dry clay and mixed 12 minutes. At this point, the clay slurry contained a sodium chloride concentration of 0.105 gram moles per liter of water.

A sample of this freshly treated slurry, representing no aging time, immediately was treated with a polymer, Nalco 635, as described in Example 4. After addition of the polymer solution, the clay slurry contained 10 percent clay solids and sodium chloride at a concentration of 0.033 gram moles per liter of water.

The refined clay suspension was recovered and processed as described in Example 2.

This specially treated clay had a brightness of 91.0, after leaching, and contained 1.24 percent, by weight, of titanium impurities expressed as $TiO_2$ and 1.09 percent, by weight, of iron impurities expressed as $Fe_2O_3$.

EXAMPLE 6

A sample of the treated slurry from Example 5, after treatment with sodium chloride, was aged for 4 hours without mixing. This aged slurry was then treated as described in Example 5.

The recovered clay had a brightness of 93.4, after leaching, and contained 0.41 percent, by weight, of titanium impurities expressed as $TiO_2$ and 1.12 percent, by weight, of iron impurities expressed as $Fe_2O_3$.

EXAMPLE 7

Example 6 was repeated, except the treated slurry was aged 22.5 hours, without mixing, prior to treatment with the polymer.

This specially refined clay had a brightness of 94.0, after leaching, and contained 0.28 percent, by weight, of titanium impurities expressed as $TiO_2$ and 1.08 percent, by weight, of iron impurities expressed as $Fe_2O_3$.

EXAMPLE 8

Example 5 was repeated, except after treating the crude with the dispersants, sodium hexametaphosphate and sodium metasilicate, the clay slurry was reduced with water to 27.89 percent clay solids prior to treatment with sodium chloride. This slurry was allowed to age without agitation, for 18 hours, at a sodium chloride concentration of 0.117 gram moles per liter of water.

After aging, this slurry was treated as described in Example 5.

This specially treated clay had a brightness of 94.7, after leaching, and contained 0.13 percent titanium impurities expressed as $TiO_2$ and 1.09 percent, by weight, of iron impurities expressed as $Fe_2O_3$.

The following three examples demonstrate the effect of aging, with mild mixing, the reflocculated and sodium chloride treated slurry for varying lengths of time prior to polymer treatment.

EXAMPLE 9

The crude clay of Example 1 was treated, in a masterbatch, by mixing with a Cowles Dissolver for 16 minutes at 65 percent solids with a dispersant, a combination of sodium hexametaphosphate, amounting to 5 pounds per ton of dry clay, and sodium metasilicate, amounting to 15 pounds per ton of dry clay. This treated clay was diluted with water to 40 percent clay solids and additionally treated with sodium chloride amounting to 15 pounds per ton of dry clay and mixed 12 minutes. This clay slurry, containing a sodium chloride concentration of 0.086 gram moles per liter of water, was aged, with mild mixing, for a period of one hour.

After aging, the slurry was treated with Betz Polymer 1230, previously dissolved in water at a concentration of 0.0667 percent by weight and amounting to 0.25 pound, dry basis, per ton of dry clay, under conditions of mild mixing for about 10 minutes.

At this point, after addition of polymer solution, the clay slurry consisted of 20 percent clay solids and contained sodium chloride at a concentration of 0.0117 gram moles per liter of water.

Immediately, upon addition of the polymer solution to the clay slurry, numerous, highly discolored flocs were observed to form and settle out of suspension as described in Example 3.

The refined clay suspension, containing about 15.3 percent clay solids, was recovered and processed as described in Example 3. This specially treated clay had a brightness of 92.6, after leaching, and contained 0.53 percent, by weight, of titanium impurities expressed as $TiO_2$ and 1.03 percent, by weight, of iron impurities expressed as $Fe_2O_3$.

EXAMPLE 10

A sample of the treated slurry from Example 9, after treatment with sodium chloride, was aged, with mild mixing, for a period of three hours prior to polymer treatment. After aging, this slurry was treated the same as Example 9.

The refined clay had a brightness of 93.2, after leaching, and contained 0.40 percent, by weight, of titanium impurities expressed as $TiO_2$ and 1.03 percent, by weight, of iron impurities expressed as $Fe_2O_3$.

EXAMPLE 11

A sample of the treated slurry from Example 9, after treatment with sodium chloride, was aged, with mild mixing, for a period of 22.5 hours prior to polymer treatment.

After aging, this slurry was treated the same as Example 9.

The refined clay of this example had a brightness, after leaching, of 92.7 and contained 0.51 percent, by weight, of titanium impurities expressed as $TiO_2$ and 1.03 percent, by weight, of iron impurities expressed as $Fe_2O_3$.

The following four examples illustrate the effect of polymer dosage upon the yield and quality of the refined clay.

EXAMPLE 12

The crude clay of Example 1 was treated by mixing with a Cowles Dissolver for 16 minutes at 65 percent solids with a dispersant, a combination of sodium hexametaphosphate, amounting to 5 pounds per ton of dry clay, and sodium metasilicate, amounting to 16.5 pounds per ton of dry clay. This treated slurry was diluted with water to 40 percent clay solids and additionally treated with sodium chloride, amounting to 16.5 pounds per ton of dry clay and mixed 12 minutes. This clay slurry contained a sodium chloride concentration of 0.0946 gram moles per liter of water.

This treated slurry containing 40 percent clay solids was aged with mild mixing for a period of 3 hours.

After aging, the slurry was treated with Betz Polymer 1230 as previously described in Example 9 and in the amount of 0.25 pounds, dry basis, per ton of dry clay. After addition of the polymer solution, the clay slurry contained 20 percent clay solids and sodium chloride at a concentration of 0.035 gram moles per liter of water.

Immediately upon addition of the polymer solution to the clay slurry, numerous, highly discolored flocs were observed to form and settle out of suspension as described in Example 3.

The refined clay suspension was recovered and processed as described in Example 3. A 47.6 percent yield of white clay, having a brightness of 93.9, after bleaching, was obtained. This clay contained 0.23 percent, by weight, of titanium impurities expressed as $TiO_2$ and 1.02 percent, by weight, of iron impurities expressed as $Fe_2O_3$.

EXAMPLE 13

Example 12 was repeated except a polymer dosage of 0.20 pounds, dry basis, per ton of dry clay was used.

A 47.7 percent yield of white clay, having a brightness of 93.7, after leaching, was obtained. This clay contained 0.27 percent, by weight, of titanium impurities expressed as $TiO_2$ and 1.04 percent, by weight, of iron impurities expressed as $Fe_2O_3$.

EXAMPLE 14

Example 12 was repeated except a polymer dosage of 0.10 pounds, dry basis, per ton of the dry clay was used.

A 57.7 percent yield of white clay, having a brightness of 93.1, after leaching, was obtained. This clay contained 0.42 percent, by weight, of titanium impurities expressed as $TiO_2$ and 1.03 percent, by weight, of iron impurities expressed as $Fe_2O_3$.

EXAMPLE 15

Example 12 was repeated except a polymer dosage of 0.04 pounds, dry basis, per ton of dry clay was used.

A 70.2 percent yield of white clay, having a brightness of 91.3, after leaching, was obtained. This clay contained 0.93 percent, by weight, of titanium impurities expressed as $TiO_2$ and 1.04 percent, by weight, of iron impurities expressed as $Fe_2O_3$.

III. The following tabulations and figures provide further examples of the variations available within the scope of the present invention.

A. The Salt

The preferred salt in the process of the present invention is sodium chloride. Other salts effective in the process of the present invention and sodium sulfate, sodium carbonate, potassium chloride, sodium nitrate and ammonium chloride. Related salts which have been found to not be effective within the present invention are sodium acetate, sodium bicarbonate, sodium hypochlorite, potassium bromide, aluminum sulfate and ammonium sulfate.

B. The Polymer

The preferred polymers of the present invention are Nalco 635 and 675, a water soluble, strongly anionic, polyacrylamide polymer with a molecular weight in excess of one million, produced by the Nalco Chemical Company, Chicago, Illinois and Betz 1200, 1210, 1220 and 1230, a water soluble, strongly anionic, organic copolymer of acrylamide having a molecular weight in excess of one million, supplied by Betz Laboratories, Inc., Trevose, Pennsylvania. The 1,200 through 1,230 series of polymers of Betz are rated, progressively, in order of their increasing numerical designations as high, very high and extremely high molecular weight. The extremely high molecular weight (approximately 12 – 13 million) 1230 polymer, consisting of 60% acrylics, is preferred in the practice of the present invention.

Polymers of a cationic or neutral character have been found unsuitable for the present invention. Further polymers, including polyacrylamides, with molecular weights less than 1 million have been found ineffective in the process of the present invention.

Thus, in the practice of the present invention, and as briefly discussed above, suitable polymers employable in the present invention comprise water-soluble strongly anionic products produced by the polymerization of acrylamides or copolymers of acrylamide and other monomers polymerizable therewith such as acrylic acid, methacrylic acid, etc. Such products are known and may be produced by conventional polymerization techniques, e.g., bulk, solution, suspension or emulsion polymerization, etc.

Thus in accordance with the present invention it is preferred to employ a water soluble, anionic polymer having the general structure

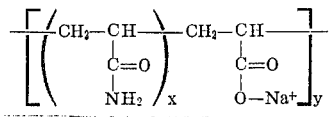

based on a polyacrylamide structure such as

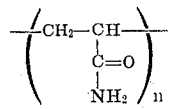

It has been discovered that the nature of the polymer is critical to the extent that the polyelectroyte must have a highly anionic character and a high molecular weight. In this regard, particularly advantageous results are obtained in the present invention when the polymer has a high molecular weight, i.e., in excess of 1 million.

C. Crude Clay Dispersion

The crude clay may preferably be dispersed at 68 – 69 percent solids with a chemical combination, including varying amounts of sodium hexametaphosphate and 5 pounds sodium metasilicate per ton of clay, by mixing with a mixing intensity of 4190 fpm for 5 minutes.

The combination of dispersants is essential for two reasons. First, sodium hexametaphosphate dosage levels required to disperse the crude cannot be tolerated in the process as it affects yield and quality of the finished product. Second, sodium metasilicate, alone, will not effectively disperse the crude in concentrated slurries. Sodium metasilicate does not affect yield and quality as critically as does the sodium hexametaphosphate.

Combinations of the two chemicals disperse the concentrated crude slurry more effectively than either chemical alone.

The effectiveness of sodium hexametaphosphate as a dispersant for East Georgia crude decreases as the dispersed slurry storage time is prolonged.

Figure 2:
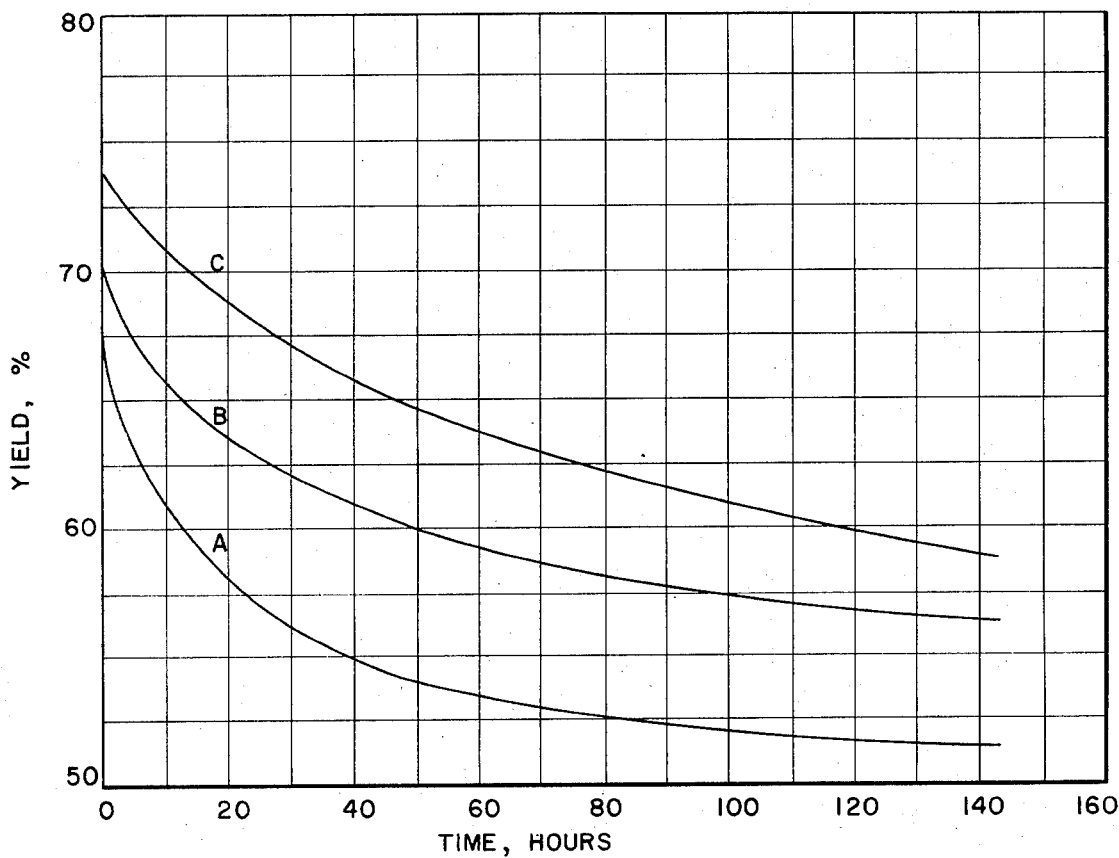
FIG. 2 shows the effect of sodium hexametaphosphate dosage on recovered clay yield following various storage times of the dispersed slurry.
Figure 3:
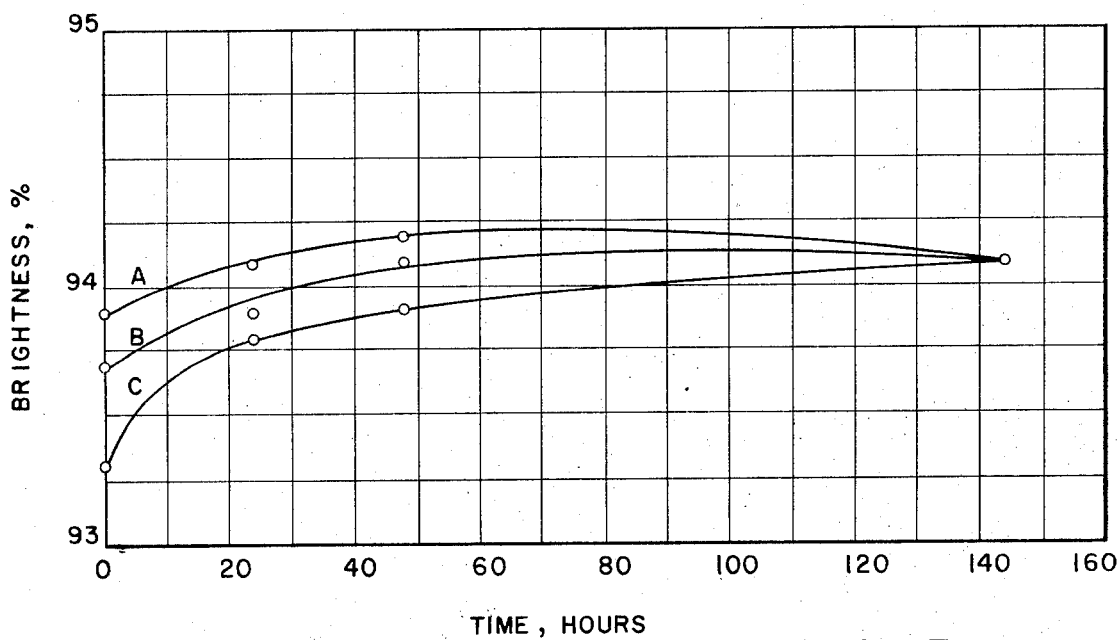
FIG. 3 shows the effect of sodium hexametaphosphate dosage on finished clay brightness following various storage times of the dispersed slurry.

A number of examples demonstrating the effect of sodium hexametaphosphate dosage versus dispersed slurry storage time on yield, brightness and content of titanium impurities retained in the finished product are shown in FIGS. 2 through 4. FIG. 2 shows the effect of sodium hexametaphosphate dosage on recovered clay yield following various storage times of the dispersed slurry.

In FIG. 2 curve A represents a sodium hexametaphosphate dosage of 3.5 pounds per ton of dry clay; curve B a dosage of 4.5 pounds per ton of dry clay; and curve C a dosage of 5.5 pounds per ton of dry clay.

FIG. 3 shows the effect of sodium hexametaphosphate dosage on finished clay brightness following various storage times of the dispersed slurry.

In FIG. 3 the sodium hexametaphosphate dosages represented by curves A, B, and C are 3.5, 4.5, and 5.5 pounds per ton of dry clay, respectively.

FIG. 4 shows the effect of sodium hexametaphosphate dosage on the precentage of titanium dioxides retained in the finished clay following various storage times of the dispersed slurry.

In FIG. 4 the sodium hexametaphosphate dosages represented by curves A, B, and C are 3.5, 4.5, and 5.5 pounds per ton of dry clay, respectively.

In each test, the sodium metasilicate dosage was 5 pounds per ton of clay.

As shown, optimization of the sodium hexametaphosphate dosages, dependent upon length of slurry storage time, becomes necessary in order to obtain product quality without unduly sacrificing yield. Some storage time, about 20 to 48 hours, is however, essential to maximum product brightness.

D. Varying Slurry Solids During Chemical Treatment

The effect of varying rate of shear by varying slurry solids during chemical treatment upon yield, refined slurry solids and brightness was determined.

Tests were performed by treating crude clay at various levels of solids content, ranging from 45 to 65 percent, while mixing for 20 minutes with a combination of chemicals consisting of 5 pounds sodium hexametaphosphate per ton of clay and 15 pounds sodium metasilicate per ton of clay. Each slurry was then diluted to 40 percent solids and treated with 16.5 pounds sodium chloride per ton of clay while mixing for an additional 15 minutes.

The above treated slurries were aged for a period of 3 hours with slow speed mixing at 40 percent solids. After aging, the slurries were diluted to 20 percent solids and treated with 0.25 pound polymer per ton of clay using slow speed agitation to incorporate the dilution water and polymer solution.

Figure 6:
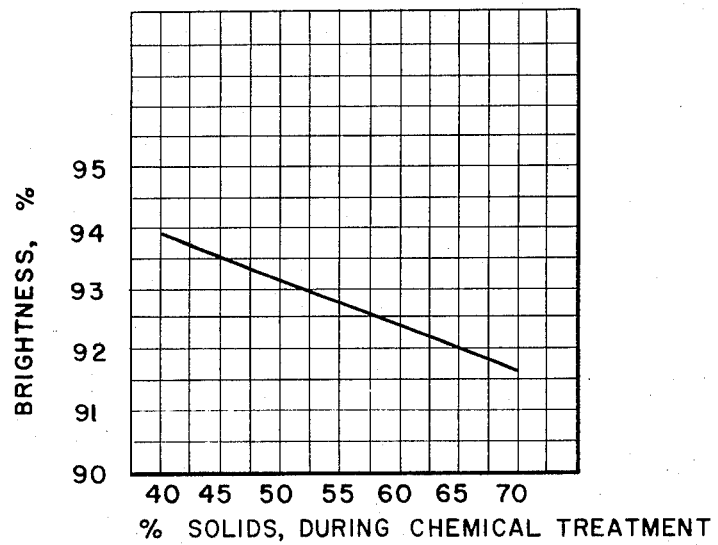
FIG. 6 shows the effect of various slurry solids during chemical treatment on the resulting brightness.
Figure 7:
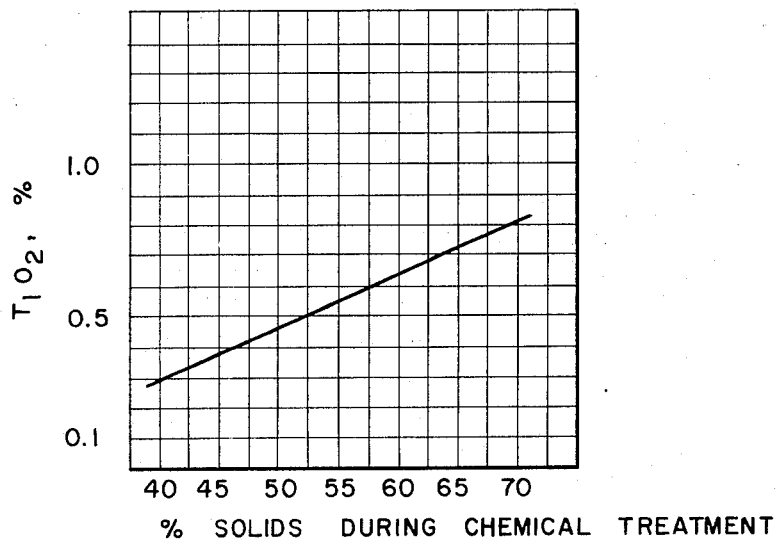
FIG. 7 shows the effect of various slurry solids during chemical treatment on the percentages of $TiO_2$ and $Fe_2O_3$ remaining in the refined finished clay.

After the polymer treatment, the resulting flocs of impurities were permitted to settle, and the refined clay suspensions were withdrawn from the sediment and processed into finished clays. The results are shown in FIGS. 5 – 7. FIG. 5 shows the effect of various slurry solids during chemical treatment on the yield. The retention time was adjusted to provide the same work input to the clay at the varying solids levels. FIG. 6 shows the effect of various slurry solids during chemical treatment on the resulting brightness. FIG. 7 shows the effect of various slurry solids during chemical treatment on the percentage of $TiO_2$ remaining in the refined finished clay. The retention time was adjusted to provide the same work input to the clay at the varying solids levels.

As shown in FIGS. 5 – 7, the shearing rates obtained with elevated slurry solids (e.g., 65 percent) are required to produce maximum yield. However, acceptable products may be produced by treating clays having a solids content of 45 percent or higher.

E. Effect of Chemical Dosages

The effect of varying amounts of chemicals upon yield, refined slurry solids and brightness was determined. This study was limited to utilization of sodium hexametaphosphate, anhydrous sodium metasilicate and sodium chloride. Polyphosphate, silicates and salts other than those listed above were less effective or undesirable.

The crude was treated with sodium hexametaphosphate, varying in amounts from three to nine pounds per ton of clay, and sodium metasilicate, varying from 12 to 16.5 pounds per ton of clay. Treatment was accomplished by mixing at 65 percent clay solids at a mixing intensity of 3,800 fpm, for 16 minutes. The slurries were then diluted to 40 percent solids and treated with sodium chloride, varying in amounts from 12.5 to 18.5 pounds per ton of clay, while mixing for an additional 12 minutes.

The above treated slurries were aged for a period of three hours with slow speed mixing at 40 percent solids. After aging, the slurries were diluted to 20 percent solids and simultaneously treated with 0.25 pounds polymer per ton of clay using mild agitation to incorporate dilution water and polymer solution with the clay slurries.

Figure 8:
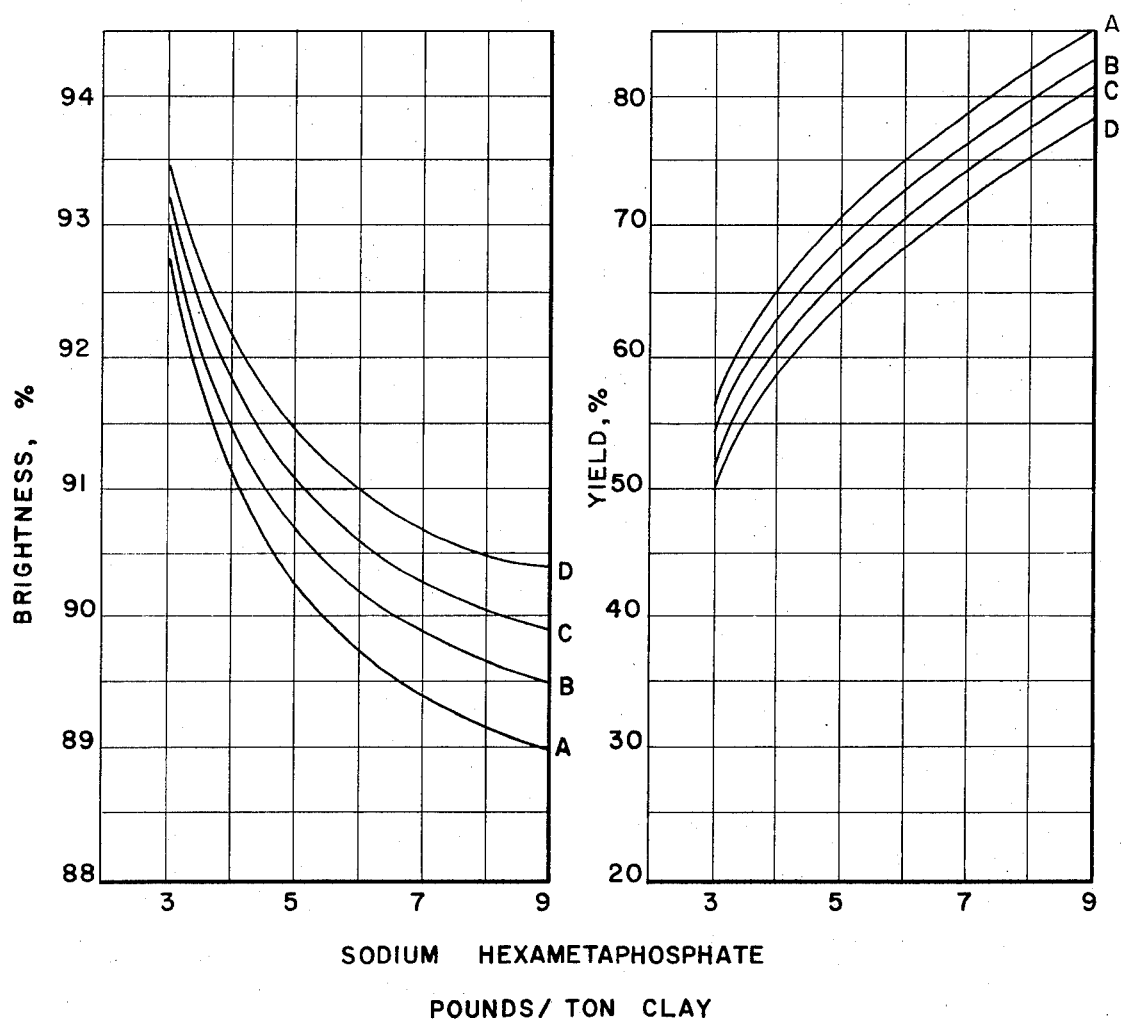
FIG. 8 shows the effect of various dosages of sodium metasilicate with various dosages of sodium hexametaphosphate and a sodium chloride dosage of 12.5 pounds per ton of dry clay on yield and brightness.

After the polymer treatment, the resulting flocs were permitted to settle. The refined clay fractions remaining in suspension were withdrawn from the sediments and processed into finished clays. The results are shown in FIG. 8 through 12. FIG. 8 shows the effect of various dosages of sodium metasilicate with various dosages of sodium hexametaphosphate and a sodium chloride dosage of 12.5 pounds per ton of dry clay on yield and brightness.

In FIG. 8, 12.5 pounds per ton of dry clay of sodium chloride were added to provide a sodium chloride concentration in the 40 percent solids slurry of 0.415 percent or 0.0713 moles per liter of water and to provide a sodium chloride concentration in the 20 percent solids slurry of 0.156 percent or 0.0267 moles per liter of water. The sodium metasilicate dosages represented by curves A, B, C, and D are 12.0, 13.5, 15.0, and 16.5 pounds per ton of dry clay, respectively.

Figure 9:
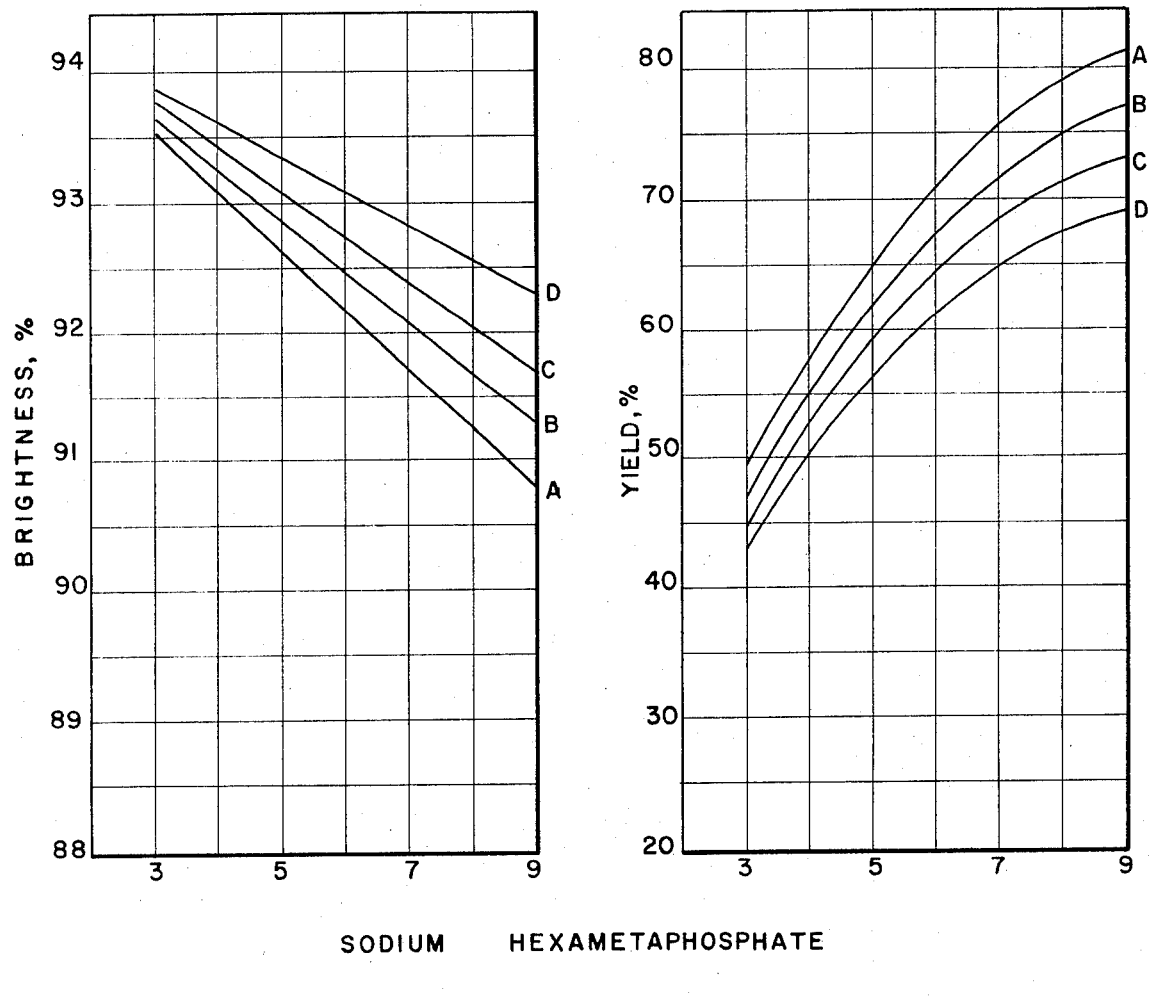
FIG. 9 shows the effect of various dosages of sodium metasilicate with various dosages of sodium hexametaphosphate and a sodium chloride dosage of 14.5 pounds per ton of dry clay on yield and brightness.

FIG. 9 shows the effect of various dosages of sodium metasilicate with various dosages of sodium hexametaphosphate and a sodium chloride dosage of 14.5 pounds per ton of dry clay on yield and brightness.

In FIG. 9, 14.5 pounds per ton of dry clay of sodium chloride were added to provide a sodium chloride concentration in the 40 percent solids slurry of 0.481 percent or 0.0827 moles per liter of water and to provide a sodium chloride concentration in the 20percent solids slurry of 0.181 percent or 0.0310 moles per liter of water. The sodium metasilicate dosages represented by curves A, B, C, and D are 12.0, 13.5, 15.0, and 16.5 pounds per ton of dry clay, respectively.

Figure 10:
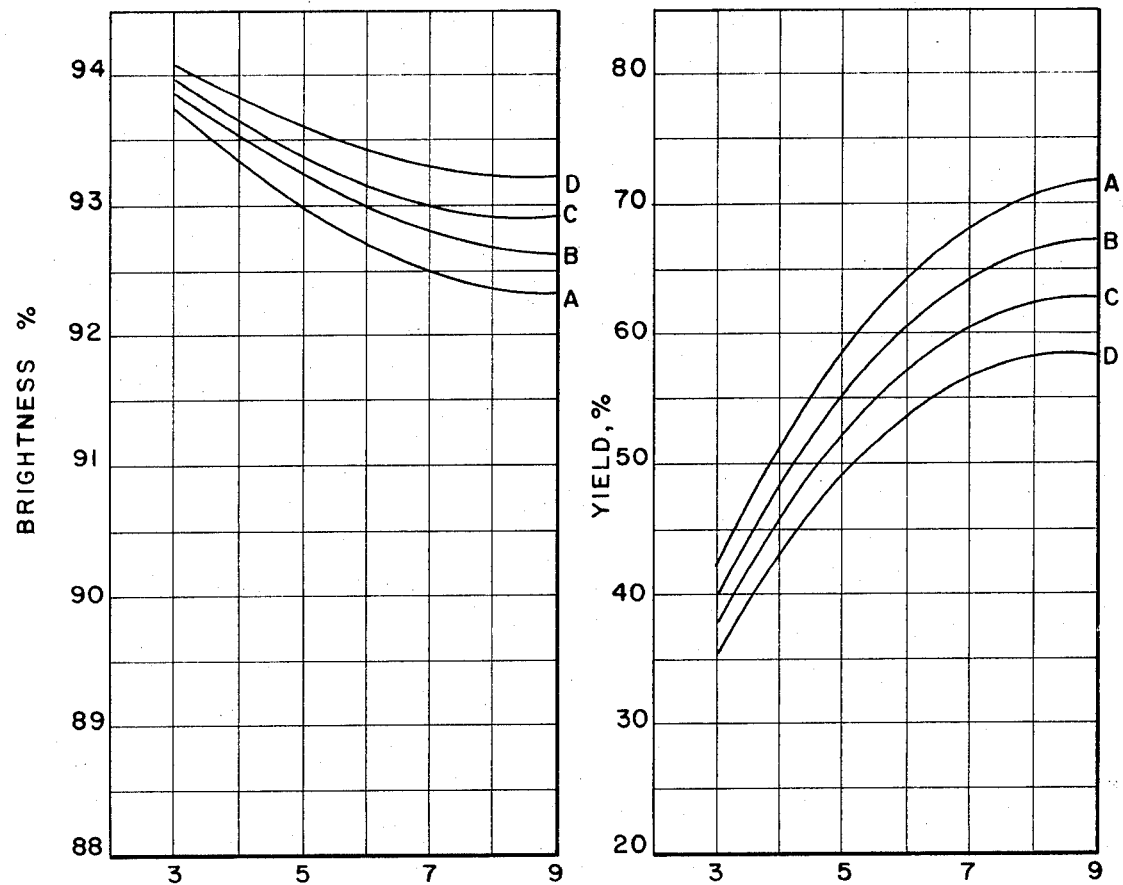
FIG. 10 shows the effect of various dosages of sodium metasilicate and sodium hexametaphosphate and a sodium chloride dosage of 16.5 pounds per ton of dry clay on yield and brightness.

FIG. 10 shows the effect of various dosages of sodium metasilicate and sodium hexametaphosphate and a sodium chloride dosage of 16.5 pounds per ton of dry clay on yield and brightness.

In FIG. 10, 16.5 pounds per ton of dry clay of sodium chloride were added to provide a sodium chloride concentration in the 40 percent solids slurry of 0.547 percent or 0.0941 moles per liter of water and to provide a sodium chloride concentration in the 20 percent solids slurry of 0.206 percent or 0.0353 moles per liter of water. The sodium metasilicate dosages represented by curves A, B, C, and D are 12.0, 13.5, 15.0, and 16.5 pounds per ton of dry clay, respectively.

Figure 11:
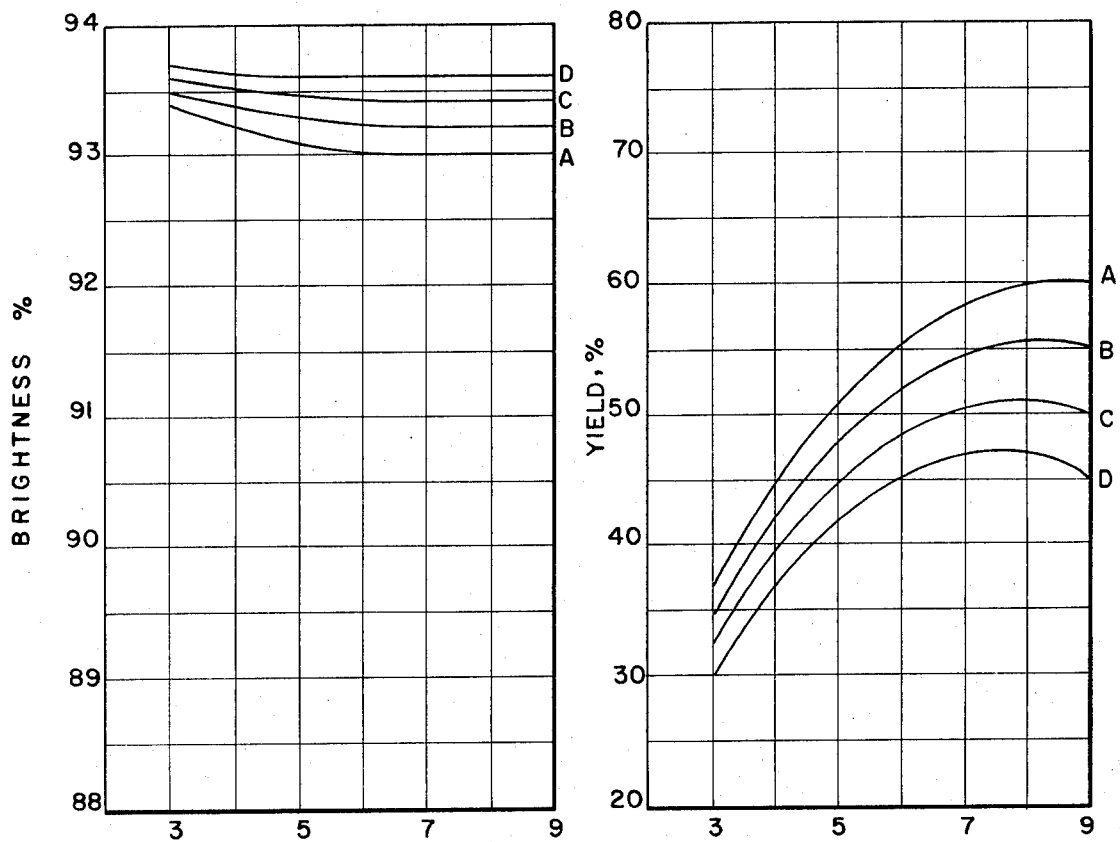
FIG. 11 shows the effect of various dosages of sodium metasilicate and sodium hexametaphosphate and a sodium chloride concentration of 18.5 pounds per ton of dry clay on yield and brightness.

FIG. 11 shows the effect of various dosages of sodium metasilicate and sodium hexametaphosphate and a sodium chloride concentration of 18.5 pounds per ton of dry clay on yield and brightness.

In FIG. 11, 18.5 pounds per ton of dry clay of sodium chloride were added to provide a sodium chloride concentration in the 40 percent solids slurry of 0.613 percent or 0.1055 moles per liter of water and to provide a sodium chloride concentration in the 20 percent solids slurry of 0.231 percent or 0.0396 moles per liter of water. The sodium metasilicate dosages represented by curves A, B, C, and D are 12.0, 13.5, 15.0, and 16.5 pounds per ton of dry clay, respectively.

Figure 12:
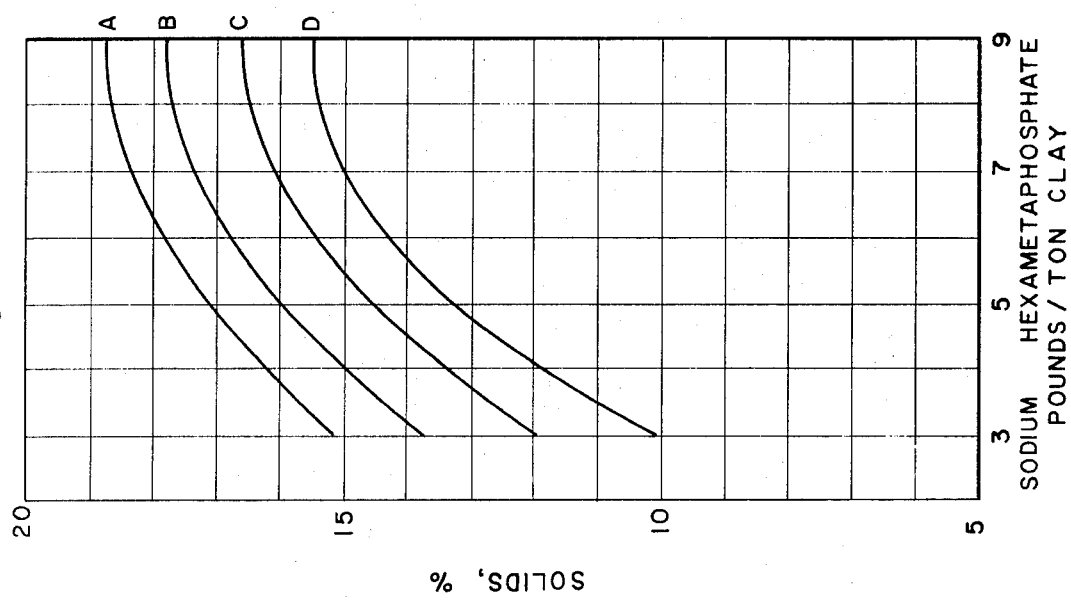
FIG. 12 shows the effect of various sodium chloride dosages at various sodium hexametaphosphate dosages and an average dosage of sodium metasilicate of from 12 – 16.5 pounds per ton of dry clay on refined slurry solids.

FIG. 12 shows the effect of various sodium chloride dosages at various sodium hexametaphosphate dosages and an average dosage of sodium metasilicate of from 12 – 16.5 pounds per ton of dry clay on refined slurry solids.

In FIG. 12, showing the effect of chemical dosages on refined slurry solids, an average sodium metasilicate dosage in the range of 12.0 to 16.5 pounds per ton of dry clay is represented. The sodium chloride dosages represented by curves A, B, C, and D are, respectively:

| | SODIUM CHLORIDE | | |
|---|---|---|---|
| | No./T Clay | Concentration, % Slurry Solids, % | |
| | | 40% | 20% |
| A | 12.5 | 0.415 | 0.166 |
| B | 14.5 | 0.481 | 0.181 |

-Continued

SODIUM CHLORIDE

| No./T Clay | Concentration, % Slurry Solids, % | |
| --- | --- | --- |
| | 40% | 20% |
| C    16.5 | 0.547 | 0.206 |
| D    18.5 | 0.613 | 0.231 |

FIGS. 8 through 11 show the effect of varying sodium hexametaphosphate and sodium metasilicate dosages in combinations with constant amounts of sodium chloride with the sodium chloride dosage varying from one figure to the next.

In addition to being shown in dosages as pounds per ton of clay, the sodium chloride is also shown as a concentration being expressed as a percent solution based upon the amount of water present in each slurry system. These concentrations are shown for both 40 percent slurry solids and after dilution to 20 percent slurry solids. Specifically, FIG. 8 shows the effect of various dosages of sodium metasilicate with various dosages of sodium hexametaphosphate and a sodium chloride dosage of 12.5 pounds per ton of dry clay on yield and brightness. FIG. 11 shows the effect of various dosages of sodium metasilicate and sodium hexametaphosphate and a sodium chloride concentration of 18.5 pounds per ton of dry clay on yield and brightness.

Generally, FIGS. 8 through 11 show the following effects.

Increasing sodium hexametaphosphate dosages resulted in decreasing brightness and increasing yield values. However, the degree of change in values as affected by increasing yield values. However, the degree of change in values as affected by increasing sodium hexametaphosphate dosages was progressively lessened as the sodium metasilicate and sodium chloride dosages were increased. This was specifically true for the brightness values as illustrated by comparing FIGS. 8 through 11.

Increasing sodium metasilicate dosages resulted in increasing brightness and decreasing yield values. The degree of change in values as affected by increasing sodium metasilicate dosages were progressively increased with increasing sodium hexametaphosphate dosages and, reversely, decreased with increasing sodium chloride dosages.

Increasing sodium chloride dosages also resulted in increasing brightness yield values. In this case, the degree of change in brightness values as affected by increasing sodium chloride dosages was progressively increased as sodium metasilicate dosages increased.

The above interpretation serves to illustrate the necessity of selecting and carefully maintaining a balance of chemical dosages in order to produce optimum brightness and yield values.

FIG. 12 illustrates the effect of varying chemical dosages upon the refined slurry solids content. Since sedimentation of each slurry was performed at 20 percent solids, the resulting values were solely dependent upon chemical dosages. Specifically FIG. 12 shows the effect of various sodium chloride dosages at various sodium hexametaphosphate dosages and an average dosage of sodium metasilicate of from 12 – 16.5 pounds per ton of dry clay on refined slurry solids.

In general, FIG. 12 shows the following effects.

Increasing sodium hexametaphosphate dosages resulted in increasing slurry solids content.

The effect of varying amounts of sodium metasilicate, within the range tested, was less than ± 1 percent slurry solids, therefore, only average values are shown.

Slurry solids were decreased with increasing sodium chloride dosages for each level of sodium hexametaphosphate utilized.

F. Aging of Chemically Treated Slurry

Figure 15:
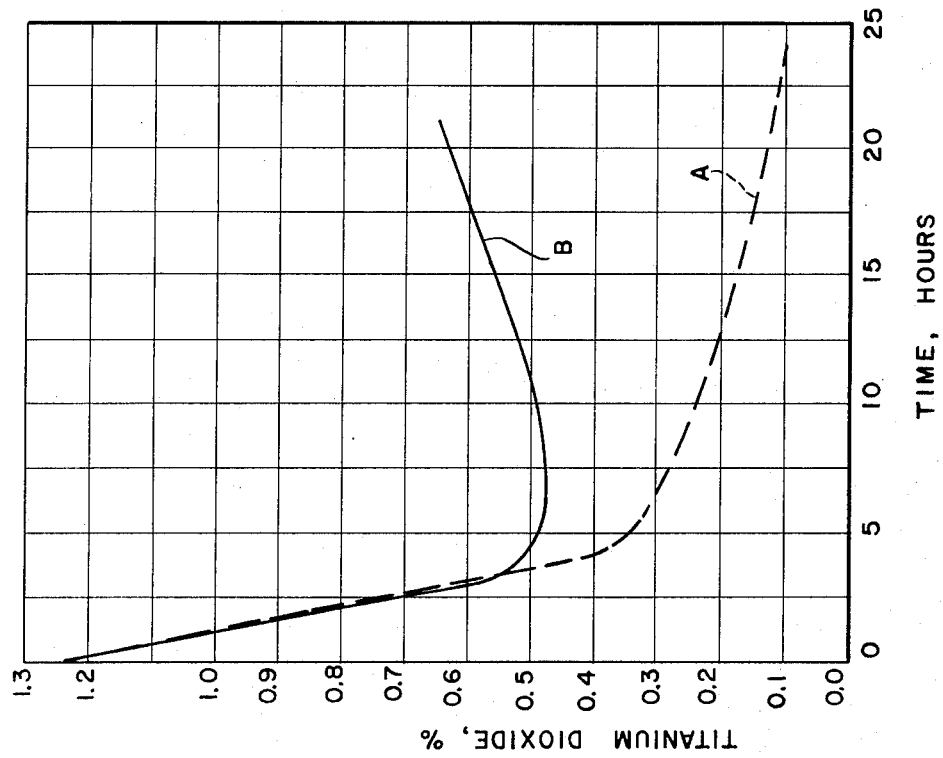
FIG. 15 shows the effect of static aging and aging with mixing of a reflocculated clay slurry on the titanium dioxide retained in the finished clay.
Figure 13:
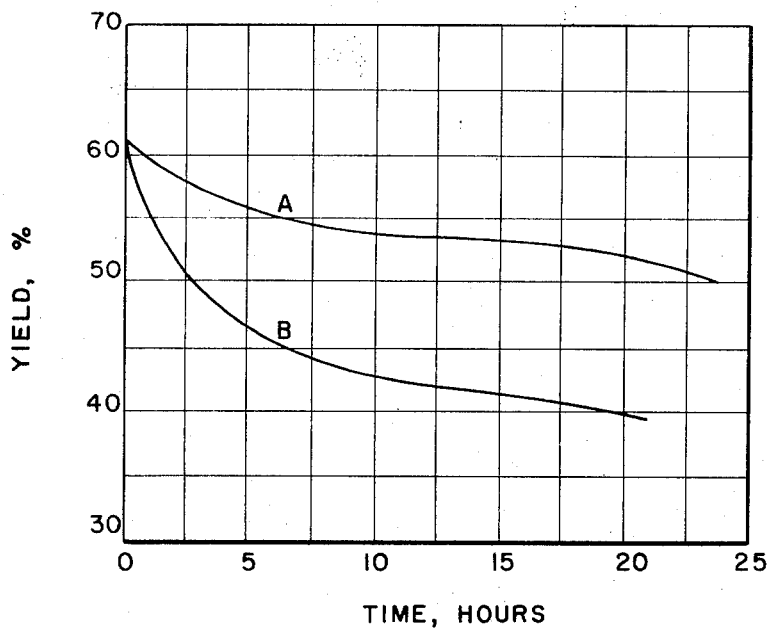
FIG. 13 shows the effect of static aging and aging with mixing of a reflocculated clay slurry on the recovered clay yield.
Figure 14:
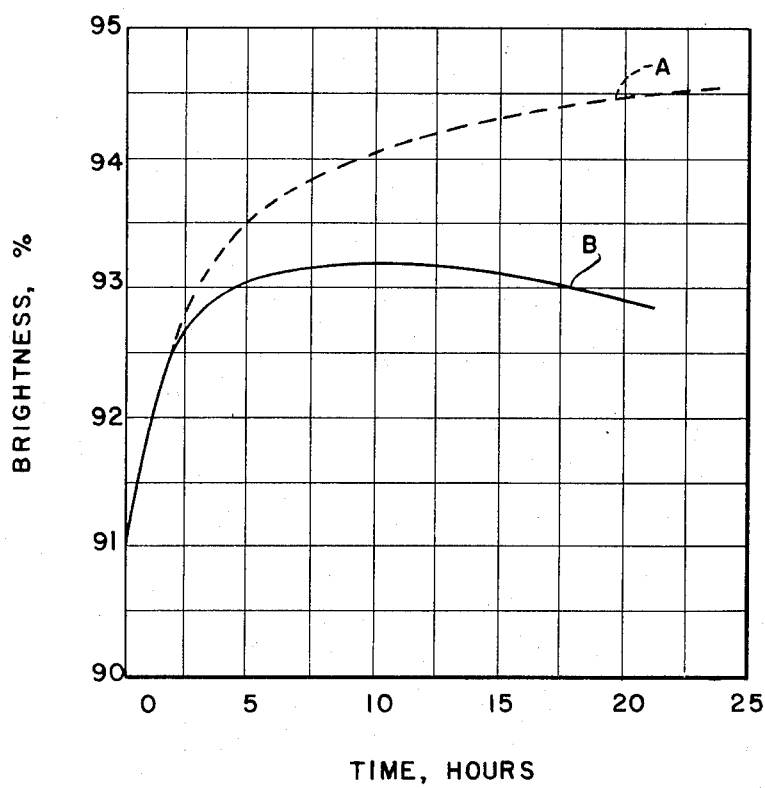
FIG. 14 shows the effect of static aging and aging with mixing of a reflocculated clay slurry on finished clay brightness.

Following chemical treatment, the slurry typically may be aged. The effects of static aging and mixing are shown in FIGS. 13 through 15. Specifically, FIG. 13 shows the effect of static aging and aging with mixing of a reflocculated clay slurry on the recovered clay yield.

In FIG. 13 curve A represents static aging and curve B represents aging while mixing.

FIG. 14 shows the effect of static aging and aging with mixing of a reflocculated clay slurry on finished clay brightness.

In FIG. 14 curve A represents static aging and curve B represents aging while mixing.

FIG. 15 shows the effect of static aging and aging with mixing of a reflocculated clay slurry on the titanium dioxide retained in the finished clay.

In FIG. 15 curve A represents static aging and curve B represents aging while mixing.

As illustrated, the highest brightness values and lowest titanium levels were obtained under conditions of slurry aging without mixing. Yield levels decreased with time under both conditions of aging, however, they decreased to a lesser degree as the slurry was aged without mixing. Optimum values in product brightness appear to require about 20 hours of aging under conditions of non-mixing.

G. Polymer Dosages

Additional tests were performed by the same method of the present invention with constant dosages of 15 pounds sodium metasilicate per ton of clay and 16.5 pounds sodium chloride per ton of clay being utilized in each test. The sodium hexametaphosphate was varied in amounts from 3 to 9 pounds per ton of clay. The polymer was varied from 0.04 to 0.25 pounds, dry basis, per ton of clay. The results are shown in FIG. 16.

Figure 16:
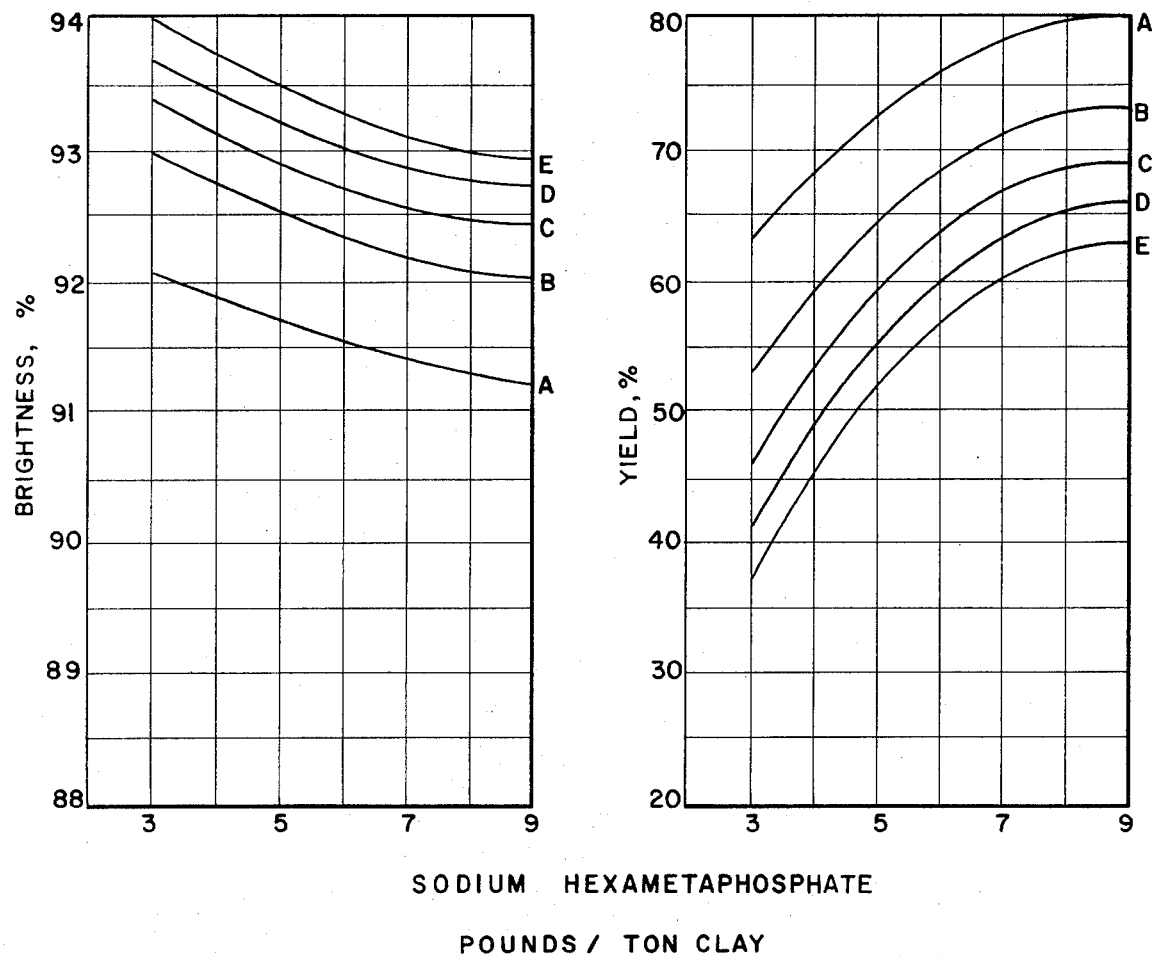
FIG. 16 shows the effect of polymer dosage on brightness and yield at various dosages of sodium hexametaphosphate.

In FIG. 16 the sodium metasilicate dosage is 15 pounds per ton of dry clay, the sodium chloride dosage is 16.5 pounds per ton of dry clay giving a sodium chloride concentration in a 40 percent solids slurry of 0.547 percent and in a 20 percent solids slurry of 0.206 percent. The polymer dosages represented by the curves in pounds per ton of dry clay are:

```
A — 0.04
B — 0.10
C — 0.15
D — 0.20
E — 0.25
```

As shown, brightness values increased as the polymer dosage was increased. However, for each polymer dosage, the brightness value was decreased as sodium hexametaphosphate dosages were increased. A reverse effect was shown for yield values. Increasing polymer dosages produced decreasing yield values. But, for each polymer dosage, yield values increased as the sodium hexametaphosphate dosages were increased.

Under conditions shown in FIG. 16, it can be seen that dosages of 0.20 to 0.25 pounds polymer per ton of clay utilized in combination with about five pounds sodium hexametaphosphate per ton of clay were required in order to produce optimum yields of 93+ brightness clays.

H. Varying Concentrations of Sodium Chloride

As noted above, the amount of sodium chloride strongly affects product quality and yield. However, these values are affected by the sodium chloride concentration, based upon the weight of sodium chloride dissolved in that amount of water present in the slurry system and expressed as a percent solution rather than being based on the weight of dry clay. These concentrations, also, may be expressed as moles per liter when based upon volume of sodium chloride-water solution but not total slurry volume.

It can be shown that optimum concentrations required to produce maximum brightness values are higher during the slurry aging period than during the polymer treatment phase of the process. Thus, a reduction in slurry solids or increased water content is required at the time of polymer treatment.

Various studies were made to determine the effect of varying sodium chloride concentrations during two phases of the process, the phase of treating and aging clay slurries with the sodium chloride and the polymer treatment phase. The tests were performed by treating slurries of different solids content with varying amounts of sodium chloride, thus establishing a range of concentrations at the same solids content, and also, maintaining same concentrations with different solids content. At the time of polymer treatment, slurries containing the same chloride concentrations were diluted with water to varying levels of solids content, thus establishing a different range in concentration levels from the sodium chloride treatment and aging phase.

Each test was performed by slurrying crude clay at 69 percent solids for a period of 10 minutes at a mixing intensity of 4190 fpm. Dispersion was accomplished with a chemical solution consisting of a sodium hexametaphosphate and sodium metasilicate combination equivalent to five pounds, each, per ton of clay.

After dispersion, the crude was aged overnight with mild agitation. After aging, the dispersed slurry was treated with a chemical solution consisting of equivalents to 1 pound of sodium hexametaphosphate per ton of clay and 10 pounds sodium metasilicate per ton of clay, by mixing for 30 minutes at 65 percent solids utilizing the same mixing intensity as for dispersion.

Portions of the above treated slurry were reduced in solids content to various levels and additionally treated with different amounts of sodium chloride, by mixing at a mixing intensity of 3,800 fpm for a period of 12 minutes.

After treatment with sodium chloride, each slurry was aged, with mild mixing, for a period of 3 hours.

After aging, the slurries were again diluted to various solids content and treated with a solution of polymer at a concentration of 0.027 percent and in an amount equivalent to 0.25 pounds, dry basis, per ton of clay. The dilution water and polymer solution was incorporated with the aged slurries by mild mixing. The resulting flocs of impurities were settled out of suspension at a sedimentation rate equivalent to 0.05 hours (3 minutes) per inch of slurry depth.

The refined clay fractions remaining in suspension were withdrawn from the sediments and processed into finished clays. Details of the various tests are tabulated below.

| SODIUM CHLORIDE TREATMENT AND AGING PHASE | | | | POLYMER TREATMENT PHASE | | | PRODUCT VALUES | | |
|---|---|---|---|---|---|---|---|---|---|
| Slurry Solids, % | NaCl No./Ton Clay | NaCl Conc., % | NaCl Moles/ Liter | Slurry Solids, % | NaCl Conc., % | NaCl Moles/ Liter | Brightness, % | Yield, % | Refined Slurry Solids, % |
| 35.0 | 14.84 | 0.398 | 0.0684 | 16 | 0.141 | 0.0242 | 90.9 | 75.0 | 13.4 |
| 35.0 | 14.84 | 0.398 | 0.0684 | 18 | 0.163 | 0.0279 | 91.6 | 68.0 | 14.2 |
| 35.0 | 14.84 | 0.398 | 0.0684 | 20 | 0.185 | 0.0314 | 92.1 | 61.8 | 15.0 |
| 35.0 | 14.84 | 0.398 | 0.0684 | 22 | 0.209 | 0.0358 | 92.5 | 56.8 | 16.0 |
| 35.0 | 14.84 | 0.398 | 0.0684 | 24 | 0.234 | 0.0401 | 92.8 | 50.4 | 16.9 |
| 35.0 | 14.84 | 0.398 | 0.0684 | 26 | 0.260 | 0.0446 | 93.0 | 45.0 | 17.8 |
| 35.0 | 17.35 | 0.465 | 0.0799 | 14 | 0.141 | 0.0242 | 91.7 | 75.0 | 11.8 |
| 35.0 | 17.35 | 0.465 | 0.0799 | 16 | 0.165 | 0.0283 | 92.2 | 68.0 | 12.6 |
| 35.0 | 17.35 | 0.465 | 0.0799 | 18 | 0.190 | 0.0358 | 92.6 | 60.5 | 13.4 |
| 35.0 | 17.35 | 0.465 | 0.0799 | 20 | 0.216 | 0.0371 | 93.0 | 54.3 | 14.4 |
| 35.0 | 17.35 | 0.465 | 0.0799 | 22 | 0.244 | 0.0419 | 93.2 | 48.0 | 15.0 |
| 35.0 | 17.35 | 0.465 | 0.0799 | 24 | 0.273 | 0.0469 | 93.2 | 42.0 | 16.0 |
| 35.0 | 19.84 | 0.531 | 0.0914 | 12 | 0.135 | 0.0232 | 92.2 | 76.7 | 9.9 |
| 35.0 | 19.84 | 0.531 | 0.0914 | 14 | 0.161 | 0.0276 | 92.7 | 69.0 | 11.0 |
| 35.0 | 19.84 | 0.531 | 0.0914 | 16 | 0.186 | 0.0323 | 93.1 | 61.4 | 11.9 |
| 35.0 | 19.84 | 0.531 | 0.0914 | 18 | 0.217 | 0.0373 | 93.4 | 54.0 | 12.6 |
| 35.0 | 19.84 | 0.531 | 0.0914 | 20 | 0.247 | 0.0424 | 93.6 | 47.2 | 13.2 |
| 35.0 | 19.84 | 0.531 | 0.0914 | 22 | 0.279 | 0.0479 | 93.7 | 41.0 | 14.0 |
| 35.0 | 22.27 | 0.596 | 0.1026 | 10 | 0.124 | 0.0212 | 92.3 | 79.0 | 8.0 |
| 35.0 | 22.27 | 0.596 | 0.1026 | 12 | 0.152 | 0.0260 | 92.8 | 71.0 | 9.2 |
| 35.0 | 22.27 | 0.596 | 0.1026 | 14 | 0.181 | 0.0310 | 93.3 | 62.8 | 10.3 |
| 35.0 | 22.27 | 0.596 | 0.1026 | 16 | 0.212 | 0.0363 | 93.6 | 55.2 | 11.0 |
| 35.0 | 22.27 | 0.596 | 0.1026 | 18 | 0.244 | 0.0418 | 93.8 | 48.2 | 11.5 |
| 35.0 | 22.27 | 0.596 | 0.1026 | 20 | 0.278 | 0.0476 | 93.9 | 41.2 | 12.0 |
| 40.0 | 12.0 | 0.398 | 0.0684 | 20 | 0.150 | 0.0257 | 91.9 | 62.8 | 15.2 |
| 40.0 | 12.0 | 0.398 | 0.0684 | 22 | 0.169 | 0.0290 | 92.3 | 55.5 | 16.1 |
| 40.0 | 12.0 | 0.398 | 0.0684 | 24 | 0.189 | 0.0324 | 92.7 | 51.4 | 17.1 |
| 40.0 | 12.0 | 0.398 | 0.0684 | 26 | 0.210 | 0.0361 | 93.0 | 46.0 | 17.7 |
| 40.0 | 12.0 | 0.398 | 0.0684 | 28 | 0.233 | 0.0399 | 93.1 | 40.0 | 18.7 |
| 40.0 | 12.0 | 0.398 | 0.0684 | 30 | 0.257 | 0.0440 | 93.1 | 35.2 | 19.5 |

Table — Continued

| SODIUM CHLORIDE TREATMENT AND AGING PHASE | | | | POLYMER TREATMENT PHASE | | | PRODUCT VALUES | | |
|---|---|---|---|---|---|---|---|---|---|
| Slurry Solids, % | NaCl No./Ton Clay | NaCl Conc., % | NaCl Moles/ Liter | Slurry Solids, % | NaCl Conc., % | NaCl Moles/ Liter | Brightness, % | Yield, % | Refined Slurry Solids, % |
| 40.0 | 14.0 | 0.465 | 0.0799 | 18 | 0.153 | 0.0263 | 92.4 | 61.5 | 13.6 |
| 40.0 | 14.0 | 0.465 | 0.0799 | 20 | 0.175 | 0.0299 | 92.8 | 55.2 | 14.4 |
| 40.0 | 14.0 | 0.465 | 0.0799 | 22 | 0.197 | 0.0338 | 93.1 | 44.0 | 14.8 |
| 40.0 | 14.0 | 0.465 | 0.0799 | 24 | 0.221 | 0.0378 | 93.3 | 43.2 | 15.9 |
| 40.0 | 14.0 | 0.465 | 0.0799 | 26 | 0.245 | 0.0421 | 93.4 | 37.0 | 16.7 |
| 40.0 | 14.0 | 0.465 | 0.0799 | 28 | 0.272 | 0.0466 | 93.4 | 32.0 | 17.5 |
| 40.0 | 16.0 | 0.531 | 0.0913 | 16 | 0.152 | 0.0261 | 92.9 | 62.4 | 12.0 |
| 40.0 | 16.0 | 0.531 | 0.0913 | 18 | 0.175 | 0.0301 | 93.2 | 55.2 | 12.8 |
| 40.0 | 16.0 | 0.531 | 0.0913 | 20 | 0.200 | 0.0342 | 93.4 | 48.2 | 13.4 |
| 40.0 | 16.0 | 0.531 | 0.0913 | 22 | 0.225 | 0.0386 | 93.6 | 42.0 | 13.8 |
| 40.0 | 16.0 | 0.531 | 0.0913 | 24 | 0.252 | 0.0432 | 93.7 | 35.7 | 14.6 |
| 40.0 | 16.0 | 0.531 | 0.0913 | 26 | 0.281 | 0.0481 | 93.7 | 30.5 | 15.2 |
| 40.0 | 18.0 | 0.596 | 0.1027 | 14 | 0.146 | 0.0251 | 93.1 | 63.8 | 10.5 |
| 40.0 | 18.0 | 0.596 | 0.1027 | 16 | 0.171 | 0.0293 | 93.4 | 51.4 | 11.2 |
| 40.0 | 18.0 | 0.596 | 0.1027 | 18 | 0.197 | 0.0338 | 93.7 | 49.4 | 11.8 |
| 40.0 | 18.0 | 0.596 | 0.1027 | 20 | 0.224 | 0.0385 | 93.8 | 42.5 | 12.2 |
| 40.0 | 18.0 | 0.596 | 0.1027 | 22 | 0.253 | 0.0434 | 93.9 | 36.0 | 12.5 |
| 40.0 | 18.0 | 0.596 | 0.1027 | 24 | 0.284 | 0.0486 | 93.9 | 30.4 | 13.0 |
| 45.0 | 9.76 | 0.398 | 0.0683 | 23 | 0.146 | 0.0249 | 92.3 | 53.5 | 16.6 |
| 45.0 | 9.76 | 0.398 | 0.0683 | 25 | 0.162 | 0.0278 | 92.7 | 48.5 | 17.5 |
| 45.0 | 9.76 | 0.398 | 0.0683 | 27 | 0.180 | 0.0309 | 92.9 | 43.0 | 18.4 |
| 45.0 | 9.76 | 0.398 | 0.0683 | 29 | 0.199 | 0.0341 | 93.1 | 38.0 | 19.2 |
| 45.0 | 9.76 | 0.398 | 0.0683 | 31 | 0.219 | 0.0375 | 93.2 | 33.4 | 20.0 |
| 45.0 | 9.76 | 0.398 | 0.0683 | 33 | 0.240 | 0.0411 | 93.2 | 29.0 | 21.0 |
| 45.0 | 11.41 | 0.465 | 0.0799 | 21 | 0.151 | 0.0260 | 92.9 | 52.5 | 14.8 |
| 45.0 | 11.41 | 0.465 | 0.0799 | 23 | 0.170 | 0.0292 | 93.2 | 46.0 | 15.6 |
| 45.0 | 11.41 | 0.465 | 0.0799 | 25 | 0.190 | 0.0325 | 93.4 | 40.5 | 16.4 |
| 45.0 | 11.41 | 0.465 | 0.0799 | 27 | 0.211 | 0.0361 | 93.5 | 35.0 | 17.2 |
| 45.0 | 11.41 | 0.465 | 0.0799 | 29 | 0.233 | 0.0398 | 93.6 | 30.0 | 17.8 |
| 45.0 | 11.41 | 0.465 | 0.0799 | 31 | 0.256 | 0.0439 | 93.6 | 25.7 | 18.7 |
| 45.0 | 13.04 | 0.531 | 0.0913 | 19 | 0.153 | 0.0262 | 93.5 | 51.5 | 13.2 |
| 45.0 | 13.04 | 0.531 | 0.0913 | 21 | 0.173 | 0.0297 | 93.6 | 44.8 | 13.7 |
| 45.0 | 13.04 | 0.531 | 0.0913 | 23 | 0.194 | 0.0333 | 93.7 | 38.5 | 14.4 |
| 45.0 | 13.04 | 0.531 | 0.0913 | 25 | 0.217 | 0.0372 | 93.8 | 33.5 | 15.1 |
| 45.0 | 13.04 | 0.531 | 0.0913 | 27 | 0.241 | 0.0413 | 93.8 | 28.5 | 15.7 |
| 45.0 | 13.04 | 0.531 | 0.0913 | 29 | 0.266 | 0.0456 | 93.8 | 24.0 | 16.4 |
| 45.0 | 14.65 | 0.596 | 0.1026 | 17 | 0.150 | 0.0257 | 93.8 | 52.5 | 11.5 |
| 45.0 | 14.65 | 0.596 | 0.1026 | 19 | 0.172 | 0.0294 | 93.9 | 45.5 | 12.0 |
| 45.0 | 14.65 | 0.596 | 0.1026 | 21 | 0.194 | 0.0333 | 94.0 | 39.0 | 12.4 |
| 45.0 | 14.65 | 0.596 | 0.1026 | 23 | 0.218 | 0.0374 | 94.0 | 33.0 | 12.8 |
| 45.0 | 14.65 | 0.596 | 0.1026 | 25 | 0.244 | 0.0418 | 94.0 | 27.5 | 13.1 |
| 45.0 | 14.65 | 0.596 | 0.1026 | 27 | 0.270 | 0.0464 | 94.0 | 23.5 | 13.4 |

Since the results obtained were complex and strongly interrelated, they were illustrated in two different sets of graphs in an attempt to simplify analyses.

Figure 17:
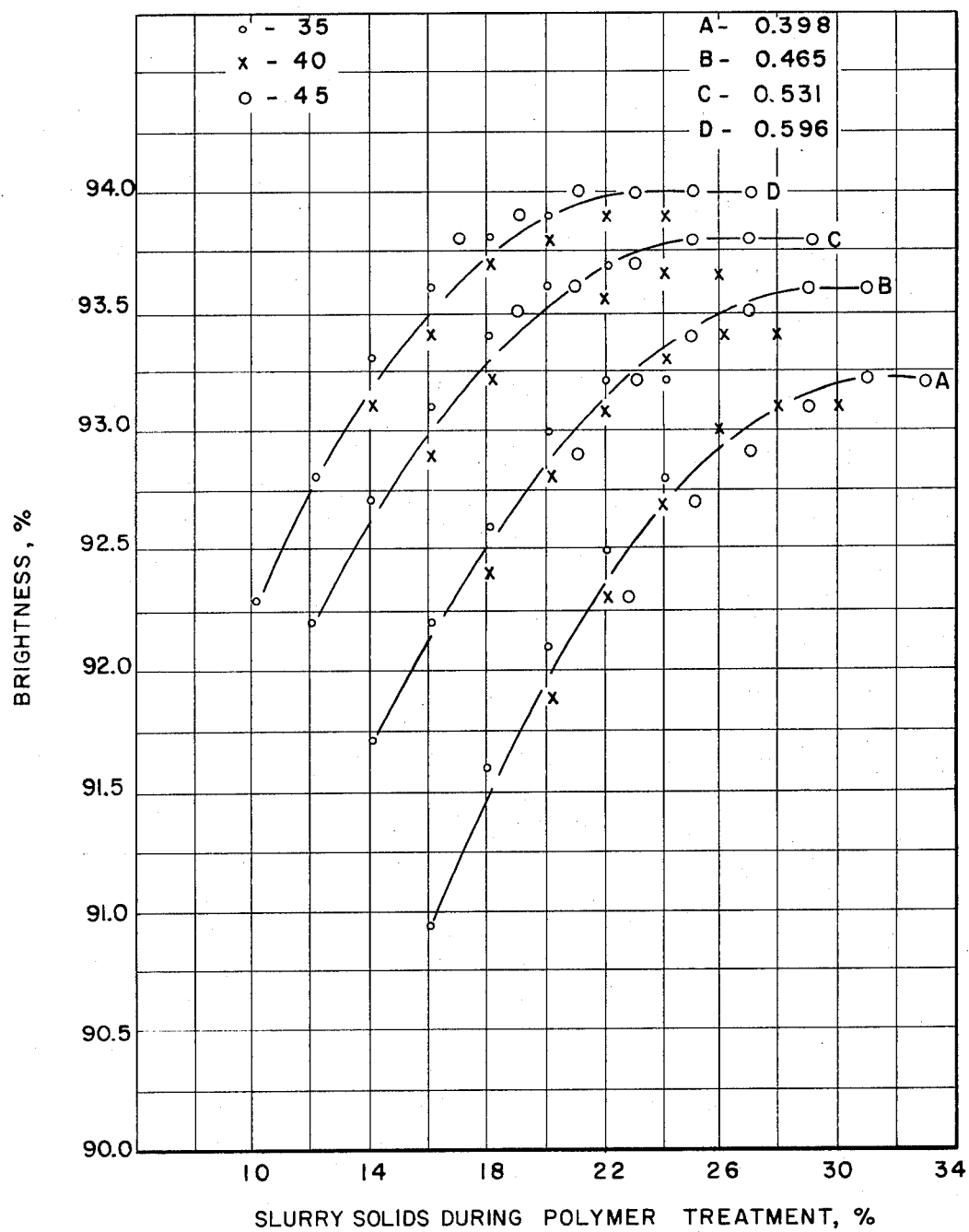
FIG. 17 shows the effect of slurry solids and sodium chloride concentration on finished clay brightness.
Figure 18:
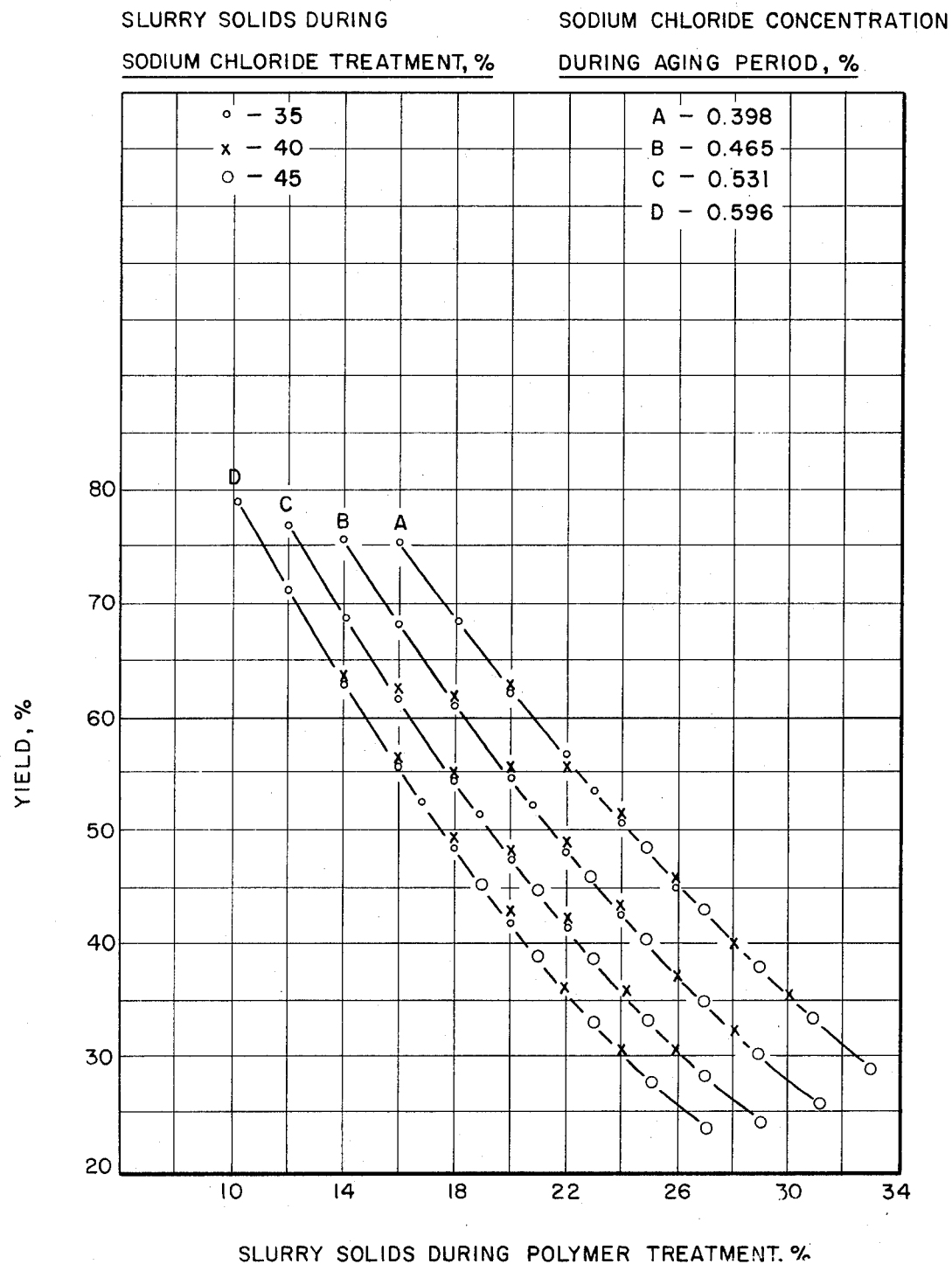
FIG. 18 shows the effect of slurry solids and sodium chloride concentration on refined clay yield.
Figure 19:
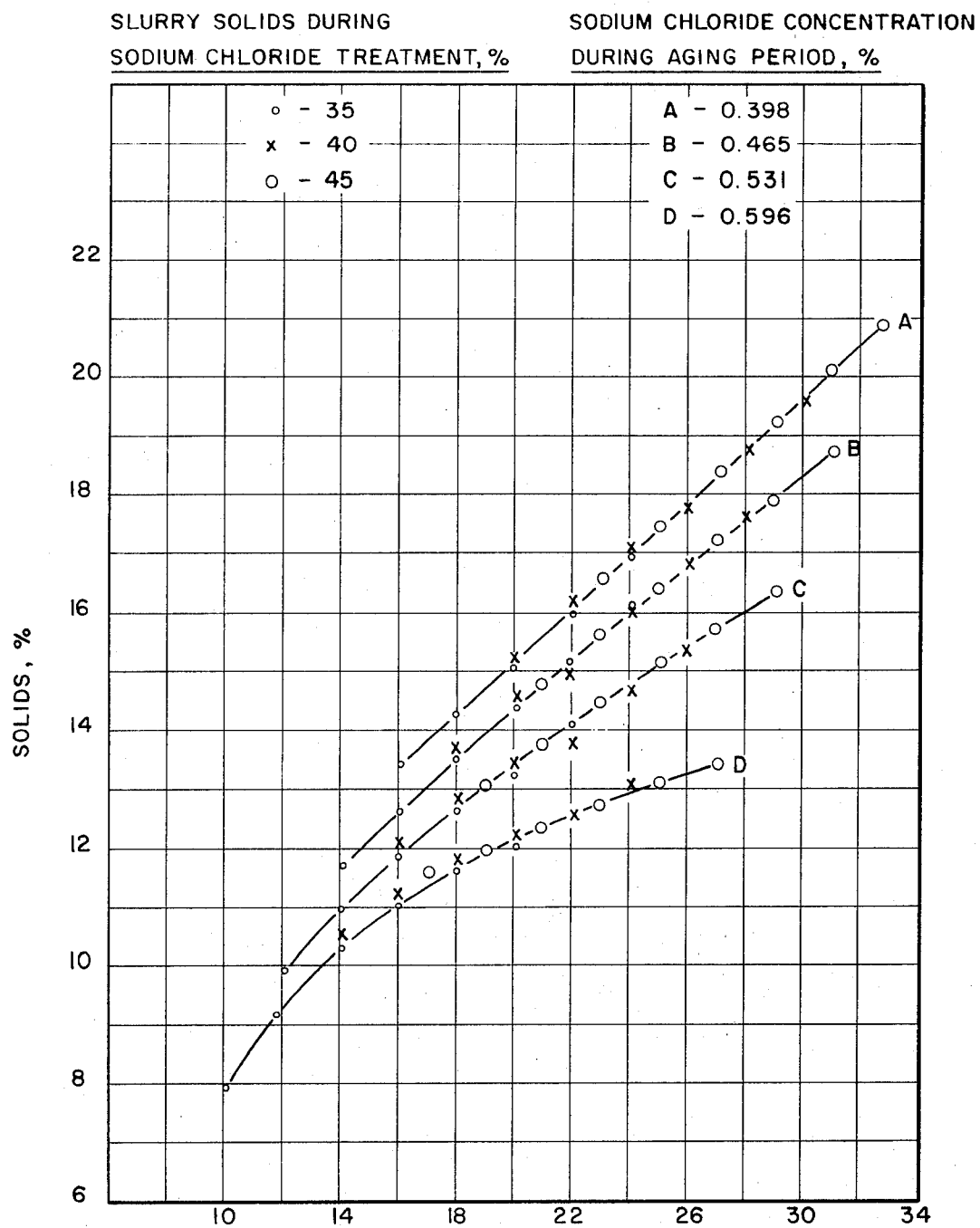
FIG. 19 shows the effect of slurry solids and sodium chloride concentration on refined slurry solids.

FIGS. 17, 18, and 19 show values of brightness, yield and refined slurry solids, respectively, plotted against a range of varying slurry solids existing during the polymer treatment phase. Each figure illustrates the results being represented by different curves as produced by different sodium chloride concentrations. Each curve was established by results consisting of partially overlapping values obtained from conditions of different slurry solids existing during the sodium chloride treatment and slurry aging phase.

The above figures serve to illustrate the following conclusions.

Wide ranges in yield and refined slurry solids were obtained for any one level of brightness; i.e., a brightness of 93 was shown for corresponding values of yield ranging from about 45 to 67 percent and refined slurry solids ranging from about 10 to 18 percent.

Wide ranges in brightness were produced at the same yield levels, i.e., a yield of 50 percent was shown for corresponding values of brightness ranging from about 92.7 to 93.8 percent and refined slurry solids ranging from about 12 to 17 percent.

Figure 20:
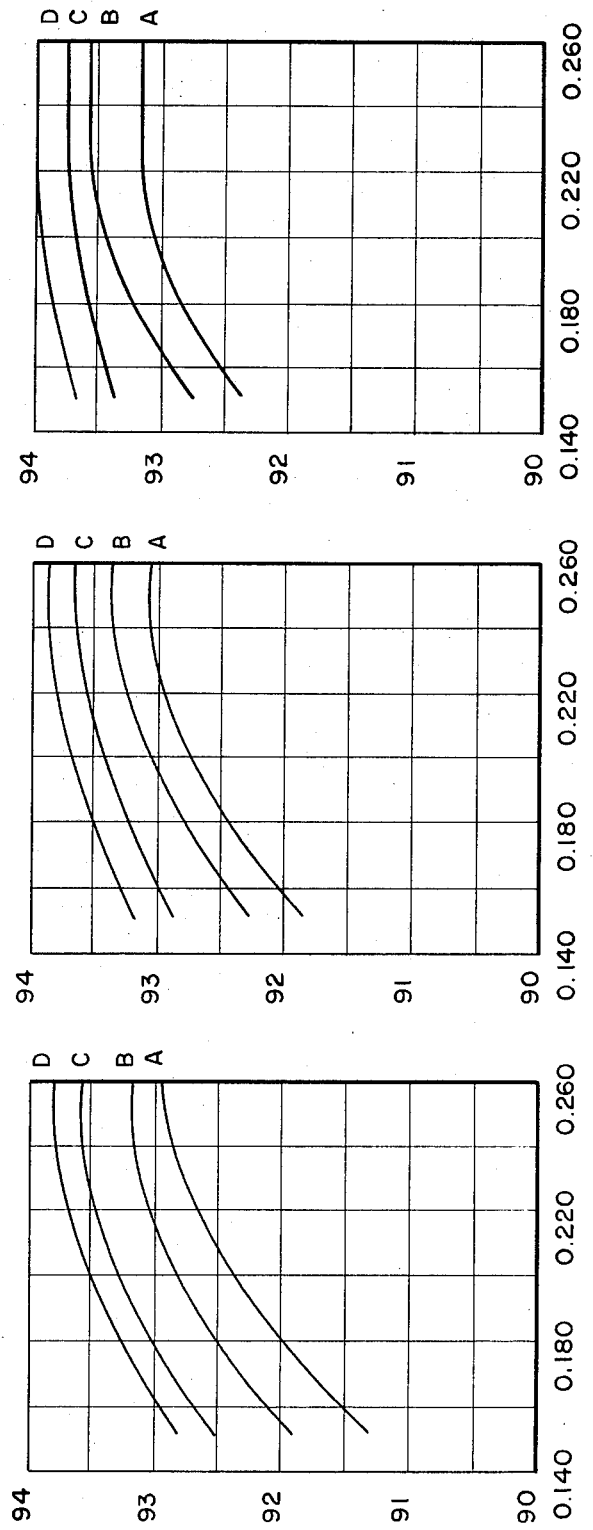
FIG. 20 shows the effect of slurry solids and sodium chloride concentration on refined clay brightness.
Figure 21:
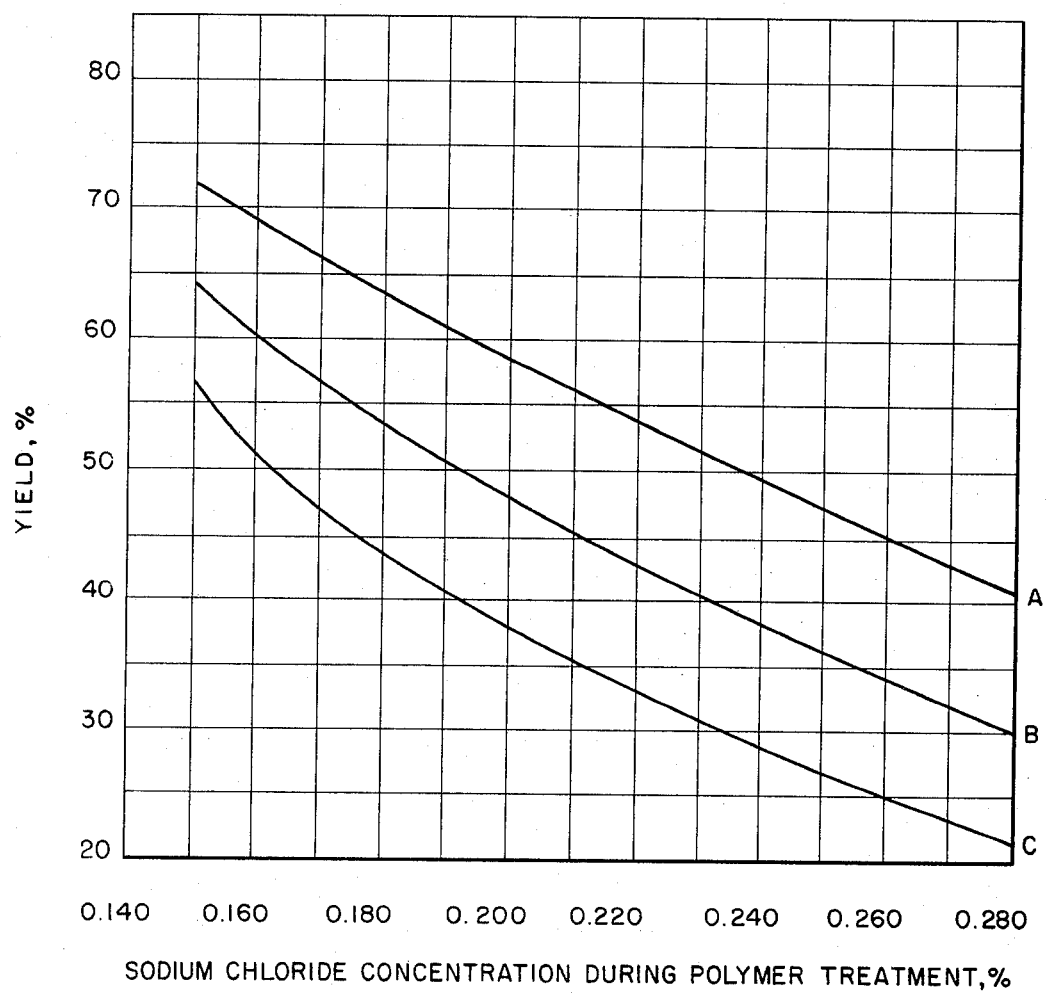
FIG. 21 shows the effect of slurry solids and sodium chloride concentration on refined clay yield.
Figure 22:
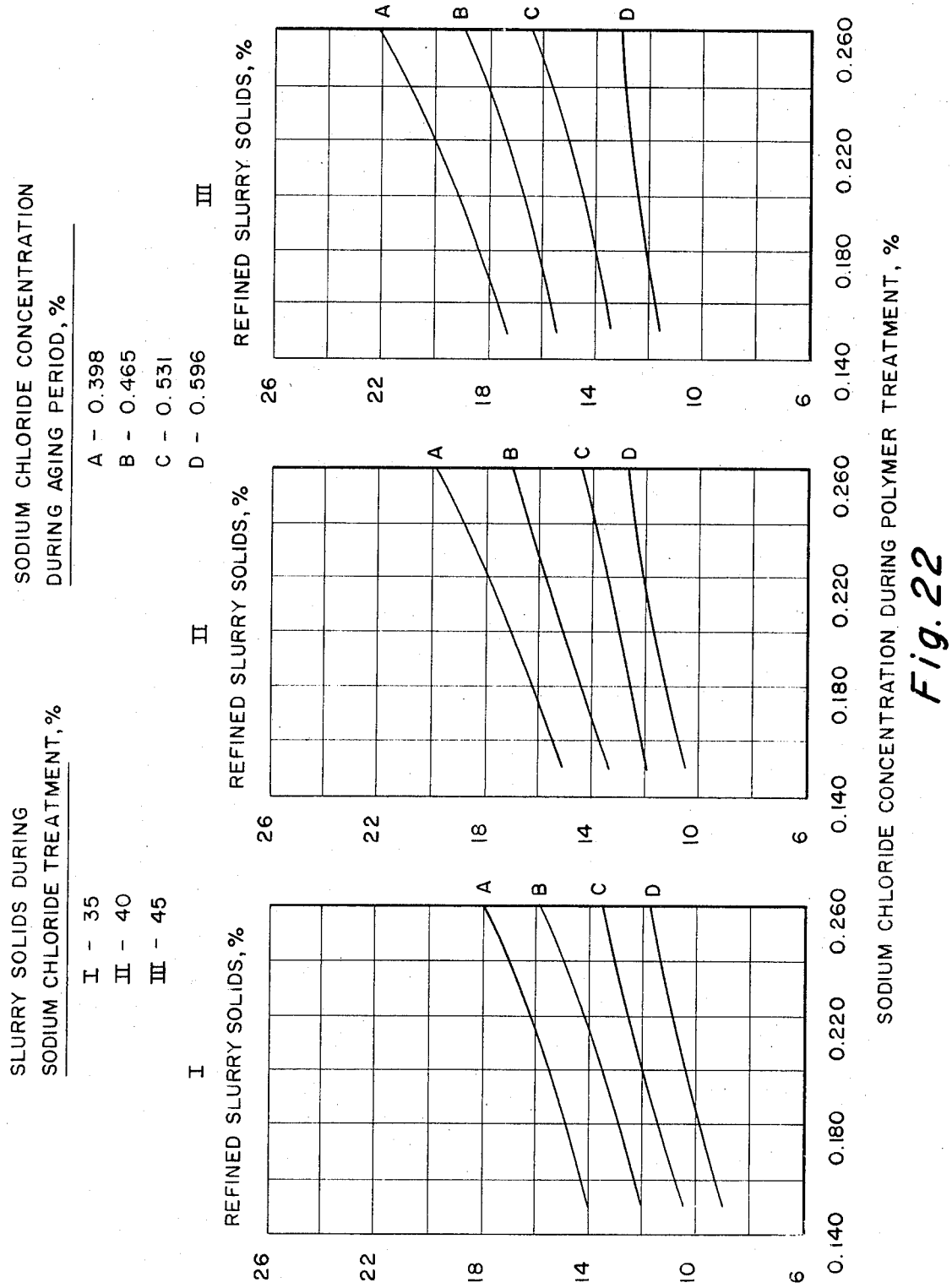
FIG. 22 shows the effect of slurry solids and sodium chloride concentration on refined slurry solids.

FIGS. 20, 21, and 22 show the same values as presented in FIGS. 17, 18, and 19 when plotted against a range of varying sodium chloride concentrations existing during the polymer treatment phase.

In FIG. 21 the slurry solids during sodium chloride treatment represented by curves A, B, and C are 35 percent, 40 percent and 45 percent, respectively.

These figures illustrate the results being represented by different curves as produced by different sodium chloride concentrations and under conditions of varying solids content existing during the sodium chloride treatment and slurry aging phase. They serve to illustrate the following generalities.

Brightness values (FIG. 20) were affected only slightly by conditions of different slurry solids existing during the treatment and slurry aging phase.

Major differences in brightness values were produced by varying sodium chloride concentrations during both phases of slurry aging and polymer treatment.

Differences in brightness values, as affected by varying sodium chloride concentrations existing during the polymer treatment phase, became progressively less as the slurry solids were increased during the treatment and aging phase.

Yield values (FIG. 21) were strongly affected by both conditions of varying slurry solids during the treatment and slurry aging phase, and by varying sodium chloride concentrations during the polymer treatment phase. Surprisingly, yield values were unaffected by varying levels of sodium chloride concentrations existing during the treatment and slurry aging phase.

Levels of refined slurry solids (FIG. 22) were affected somewhat similar to brightness values in that major differences were produced by different levels of sodium chloride concentrations existing during both phases of treatment and slurry aging and during polymer treatment.

In general, increasing levels of sodium chloride concentration produced increasing brightness values, decreasing values in both yield and refined slurry solids. However, wide differences in the amount of sodium chloride and level of slurry solids producing the same salt to water concentration can be utilized to produce clays having the same brightness level over a wide range of yields and refined slurry solids.

I. Effect of Titanium Content on Finished Clay Brightness

Figure 23:
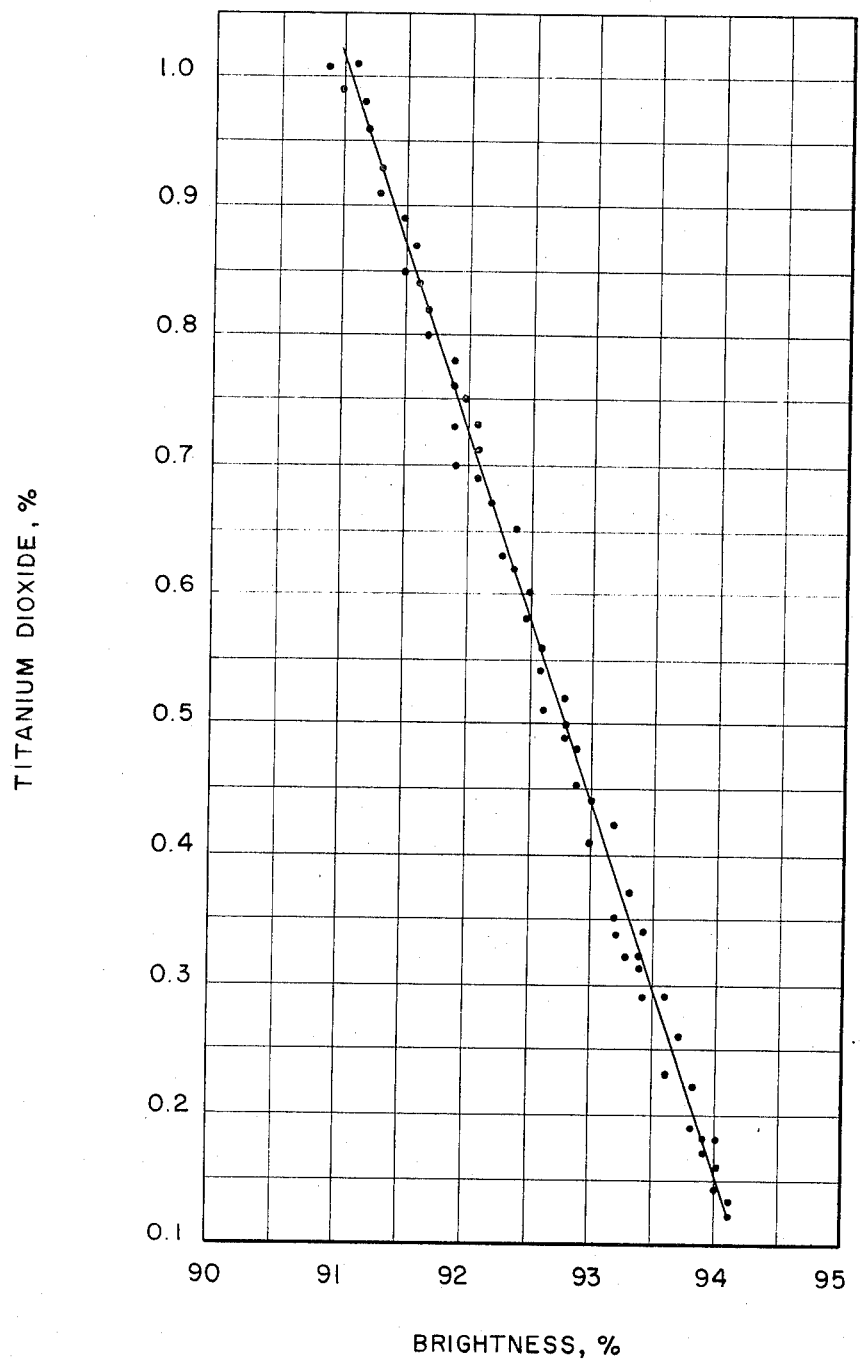
FIG. 23 shows a finished clay brightness in relation to the titanium dioxide content remaining.

The effect of the amount of titanium impurities retained in the finished clay upon brightness is shown in FIG. 23. It can be seen that the relationship is directly linear. The relationship shown in FIG. 23 will vary somewhat depending on the particular clay and is not believed to be necessarily correlative to other processes utilized for extracting titanium impurities.

J. Recovery and Processing Refined Slurries

A typical recovery and post processing is described below.

After floc formation, the impurities settled at an average rate of 2 minutes per inch of slurry depth.

After sedimentation was completed, the whitened clay remaining in suspension was withdrawn by siphoning. Under ideal processing conditions, this suspension consisted of about 17 percent clay solids.

This beneficiated clay was then acidified with 9 pounds of sulfuric acid per ton of clay to a 6.0 slurry pH and coagulated with 14 pounds of aluminum sulfate per ton of clay to a 4.3 slurry pH and filtered to remove excess soluble salts.

The resulting filter cake was diluted with water and reslurried at about 20 percent clay solids.

After washing, the clay was leached with 8 pounds of zinc dithionite per ton of clay at 60° C for 30 minutes with mild agitation. After leaching, the clay was filtered and the filter cake was dried to about 1 percent moisture content.

After treatment, each clay may be evaluated as to brightness and contents of titanium and iron impurities.

For example, a refined clay was prepared having a leached brightness, acid clay form, of 94.6 and containing less than 0.1 percent titanium impurities. Dispersing the filter cake and spray drying this material yielded a product having a 93.9 to 84.1 percent brightness.

Although a specific preferred embodiment of the present invention has been described in the detailed description above, the description is not intended to limit the invention to the particular forms or embodiments disclosed herein, since they are to be recognized as illustrative rather than restrictive and it will be obvious to those skilled in the art that the invention is not so limited. The invention is declared to cover all changes and modifications of the specific examples of the invention herein disclosed for purposes of illustration, which do not constitute departures from the spirit and scope of the invention.

What is claimed is:

1. A method of beneficiating kaolin clay consisting essentially of the steps of:
    a. treating an aqueous kaolin clay suspension of from 45 to 70 percent solids by weight with a dispersing agent in an amount in excess of that required to obtain minimum viscosity, said dispersing agent comprising the combination of sodium hexametaphosphate and sodium silicate; continuing the addition of said sodium hexametaphosphate and said sodium silicate to effect reflocculation of said aqueous kaolin clay suspension; the combined amount of said sodium hexametaphosphate and said sodium silicate being added to said aqueous suspension comprising from 2 to 10 pounds per ton of dry clay of sodium hexametaphosphate and from 8 to 20 pounds per ton of dry clay of sodium metasilicate so as to obtain said minimum viscosity and reflocculation but comprising an amount less than which produces an intractable gel state;
    b. diluting said reflocculated slurry to from 25 to 45 percent solids;
    c. treating said slurry by adding to it from 4 to 50 pounds per ton of dry clay of sodium chloride;
    d. aging said salt treated slurry for from 1 to 24 hours;
    e. further diluting said aged slurry to from 10 to 35 percent solids;
    f. adding to and mixing within said diluted aged slurry from 0.01 to 0.3 pounds per ton of dry clay of a water soluble, strongly anionic polyacrylamide polymer having a molecular weight in excess of one million, whereby a separation of titanium-polymer flocs is effected from said suspension at a sedimentation rate in excess of 10 minutes per inch of depth of said slurry, and
    g. separating the thus refined slurry from said flocs.

2. The method of claim 1 wherein said initially dispersed slurry is aged for at least 24 hours prior to reflocculation.

3. The method of claim 1 wherein the concentration of the sodium chloride during treatment of the slurry by said polymer is from 0.01 to 0.05 moles per liter of water.

4. The method of claim 1 wherein the concentration of the sodium clooride during treatment of the slurry by said polymer is from 0.124 to 0.284 percent by weight of the water present in the clay water system.

5. The method of claim 1 wherein said salt treated slurry is aged for from 1 to 5 hours with agitation.

6. The method of claim 1 wherein said salt treated slurry is statically aged for from 3 to 24 hours.

* * * * *